(12) United States Patent
Faccin et al.

(10) Patent No.: US 11,516,864 B2
(45) Date of Patent: Nov. 29, 2022

(54) LOCAL AREA DATA NETWORK CONNECTIVITY

(71) Applicant: QUALCOMM Incorporated, San Diego, CA (US)

(72) Inventors: Stefano Faccin, San Ysidro, CA (US); Haris Zisimopoulos, London (GB); Lenaig Genevieve Chaponniere, La Jolla, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/998,848

(22) Filed: Aug. 20, 2020

(65) Prior Publication Data

US 2020/0383160 A1    Dec. 3, 2020

Related U.S. Application Data

(62) Division of application No. 15/927,378, filed on Mar. 21, 2018, now Pat. No. 10,779,346.

(Continued)

(51) Int. Cl.
*H04W 76/15*   (2018.01)
*H04W 76/11*   (2018.01)
*H04W 8/18*    (2009.01)
*H04W 48/16*   (2009.01)
*H04W 28/02*   (2009.01)
(Continued)

(52) U.S. Cl.
CPC ............. *H04W 76/15* (2018.02); *H04W 8/18* (2013.01); *H04W 28/0226* (2013.01); *H04W 48/14* (2013.01); *H04W 48/16* (2013.01); *H04W 76/11* (2018.02); *H04W 48/18* (2013.01);
(Continued)

(58) Field of Classification Search
None
See application file for complete search history.

(56) References Cited

U.S. PATENT DOCUMENTS

2018/0198867 A1*  7/2018  Dao ..................... H04W 76/10
2018/0279397 A1   9/2018  Faccin et al.
(Continued)

FOREIGN PATENT DOCUMENTS

| CN | 101572855 A | 11/2009 |
|----|-------------|---------|
| CN | 101730997 A | 6/2010  |
| WO | 2008131512 A1 | 11/2008 |

OTHER PUBLICATIONS

Samsung, "Evaluation and Update to Solution 4.25: Local Area Data Network", 2016, SA WG2 Meeting #S2-118, S2-166453, pp. 1-6.*

(Continued)

*Primary Examiner* — Mohammad S Adhami
(74) *Attorney, Agent, or Firm* — Qualcomm Incorporated

(57) ABSTRACT

Certain aspects of the present disclosure relate to methods and apparatus relating to local area data network connectivity. In certain aspects, a method for use by a network device includes determining a set of available local area data networks (LADNs) for a user equipment (UE) based on a subscription of the UE to a set of data network names (DNNs) corresponding to the set of available LADNs and sending the UE information indicative of the set of available LADNs and a location of availability corresponding to each of the LADNs of the set of available LADNs.

23 Claims, 21 Drawing Sheets

Related U.S. Application Data

(60) Provisional application No. 62/477,255, filed on Mar. 27, 2017.

(51) Int. Cl.
    *H04W 48/14* (2009.01)
    *H04W 88/06* (2009.01)
    *H04W 72/04* (2009.01)
    *H04W 84/04* (2009.01)
    *H04W 48/18* (2009.01)

(52) U.S. Cl.
    CPC ...... *H04W 72/0406* (2013.01); *H04W 84/045* (2013.01); *H04W 88/06* (2013.01)

(56) References Cited

U.S. PATENT DOCUMENTS

| | | | |
|---|---|---|---|
| 2019/0037636 A1* | 1/2019 | Kim | H04W 60/00 |
| 2019/0182788 A1 | 6/2019 | Lee et al. | |
| 2019/0200264 A1* | 6/2019 | Kim | H04W 60/04 |
| 2019/0223093 A1 | 7/2019 | Watfa et al. | |
| 2019/0246342 A1 | 8/2019 | Wang et al. | |
| 2020/0053636 A1* | 2/2020 | Mas Rosique | H04W 48/18 |
| 2020/0382941 A1* | 12/2020 | Lee | H04W 36/32 |

OTHER PUBLICATIONS

Taiwan Search Report—TW107109817—TIPO—dated Aug. 13, 2021.
"3rd Generation Partnership Project; Technical Specification Group Services and System Aspects; System Architecture for the 5G System; Stage 2 (Release 15)", 3GPP Standard ; Technical Specification; 3GPP TS 23.501, 3rd Generation Partnership Project (3GPP), Mobile Competence Centre; 650, Route Des Lucioles; F-06921 Sophia-Antipolis Cedex; France, vol. SA WG2, No. V0.3.1, Mar. 6, 2017, XP051290363, pp. 1-97.
International Search Report and Written Opinion—PCT/US2018/023808—ISA/EPO—dated Aug. 29, 2018.
International Preliminary Report on Patentability—PCT/US2018/023808, The International Bureau of WIPO—Geneva, Switzerland, Oct. 10, 2019.
Kim J., et al., "3GPP SA2 Architecture and Functions for 5G Mobile Communication System", ICT Express, Mar. 1, 2017, vol. 3, No. 1, XP055407470, ISSN: 2405-9595, DOI: 10.1016/j.icte.2017.03.007, pp. 1-8.
Partial International Search Report—PCT/US2018/023808—ISA/EPO—dated Jun. 12, 2018.
Qualcomm Incorporated: "23.501 AMF-SMF Implications of Optimal UPF Placement," 3GPP Draft; S2-171714-5G-UPF-Mobility-23.501, 3rd Generation Partnership Project (3GPP), Mobile Competence Centre; 650, Route Des Lucioles; F-06921 Sophia-Antipolis Cedex; France; vol. SA WG2, No. Busan, South Korea; Mar. 27. 2017-Mar. 31, 2017, Mar. 26, 2017, XP051247454, 6 pages, Retrieved from the Internet: URL: http://www.3gpp.org/ftp/Meetings_3GPP_SYNC/SA2/Docs/ [retrieved on Mar. 26, 2017].
Qualcomm Incorporated, et al., "TS 23.501—Additional Concepts and Corrections for Support for Connectivity to a Local Area Network," 3GPP Draft; S2-171715-5G-LA-DN-23 501 V11, 3rd Generation Partnership Project (3GPP), Mobile Competence Centre; 650, Route Des Lucioles; F-06921 Sophia-Antipolis Cedex; France, vol. SA WG2, No. Busan, South Korea; Mar. 27, 2017-Mar. 31, 2017, Mar. 26, 2017, Mar. 27, 2017, XP051247455, 6 pages, Retrieved from the Internet: URL: http://www.3gpp.org/ftp/Meetings_3GPP_SYNC/SA2/Docs/ [retrieved on Mar. 26, 2017].
Samsung et al., "TS 23.502 Update 4.3.2 PDU Session Establishment for LADN", 3GPP Draft; S2-171942 TS23.502 P-CR to Update PDU Session Establishment for LADN R4, 3rd Generation Partnership Project (3GPP), Mobile Competence Centre; 650, Route Des Lucioles; F-06921 Sophia-Antipolis Cedex; France, vol. SA WG2, No. Busan, South Korea; Mar. 27, 2017-Mar. 31, 2017 Mar. 26, 2017, XP051247679, Retrieved from the Internet: URL:http://www.3gpp.org/ftp/Meetings_3GPP_SYNC/SA2/Docs/ [retrieved on Mar. 26, 2017], 6 pages.
Qualcomm Incorporated: "23.501—Additional Concepts and Corrections for Support for Connectivity to a Local Area Network", SA WG2 Meeting #S2-119, S2-170757, Feb. 13 -17, 2017, Dubrovnik, Croatia, Feb. 8, 2017, pp. 1-4.

* cited by examiner

LOCAL AREA DATA NETWORK CONNECTIVITY

CROSS-REFERENCE TO RELATED APPLICATIONS

This application is a divisional of U.S. patent application Ser. No. 15/927,378 entitled "LOCAL AREA DATA NETWORK CONNECTIVITY", which was filed on Mar. 21, 2018 and claims the benefit of and priority to U.S. Provisional Application Ser. No. 62/477,255 entitled "LOCAL AREA DATA NETWORK CONNECTIVITY," which was filed Mar. 27, 2017. The aforementioned applications are herein incorporated by reference in their entirety as if fully set forth below in their entirety and for all applicable purposes.

FIELD

The present disclosure relates generally to communication systems, and more particularly, to methods and apparatus relating to local area data network connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by an access and mobility management function (AMF). The method generally includes determining a set of available local area data networks (LADNs) for a user equipment (UE) based on a subscription of the UE to a set of data network names (DNNs) corresponding to the set of available LADNs and sending the UE information indicative of the set of available LADNs and a location of availability corresponding to each of the LADNs of the set of available LADNs.

Certain aspects provide a method for wireless communications by user equipment (UE). The method generally includes requesting information relating to one or more local area data networks (LADNs) from an access and mobility management function (AMF), receiving information from the AMF corresponding to a set of available LADNs and an area of availability corresponding to each of the LADNs of the set of available LADNs, wherein the UE has a subscription to a set of data network names (DNNs) corresponding to the set of available LADNs, and establishing a protocol data unit (PDU) session to one LADN of the set of available LADNs based on the information received from the AMF.

Certain aspects provide a method for wireless communications by an access and mobility management function (AMF). The method generally includes determining that a user equipment (UE) has moved outside of an area of availability corresponding to a local area data network (LADN) to which the UE has an established protocol data unit (PDU) session and sending a notification request to a session management function (SMF) serving the PDU session after the determining.

Certain aspects provide a method for wireless communications by an a session management function (SMF). The method generally includes receiving a notification from an access and mobility management function (AMF) that a user equipment (UE) has moved outside of an area of availability corresponding to a local area data network (LADN) to which the UE has an established protocol data unit (PDU) session and making a change to the PDU session being served by the SMF in response to the notification.

Certain aspects provide a method for wireless communications by an a session management function (SMF). The method generally includes receiving a request from a session management function (SMF) serving a protocol data unit (PDU) session that a UE has established with a local area data network (LADN) to provide the SMF with information about a location of the UE and providing the SMF with a notification including information about the location of the UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
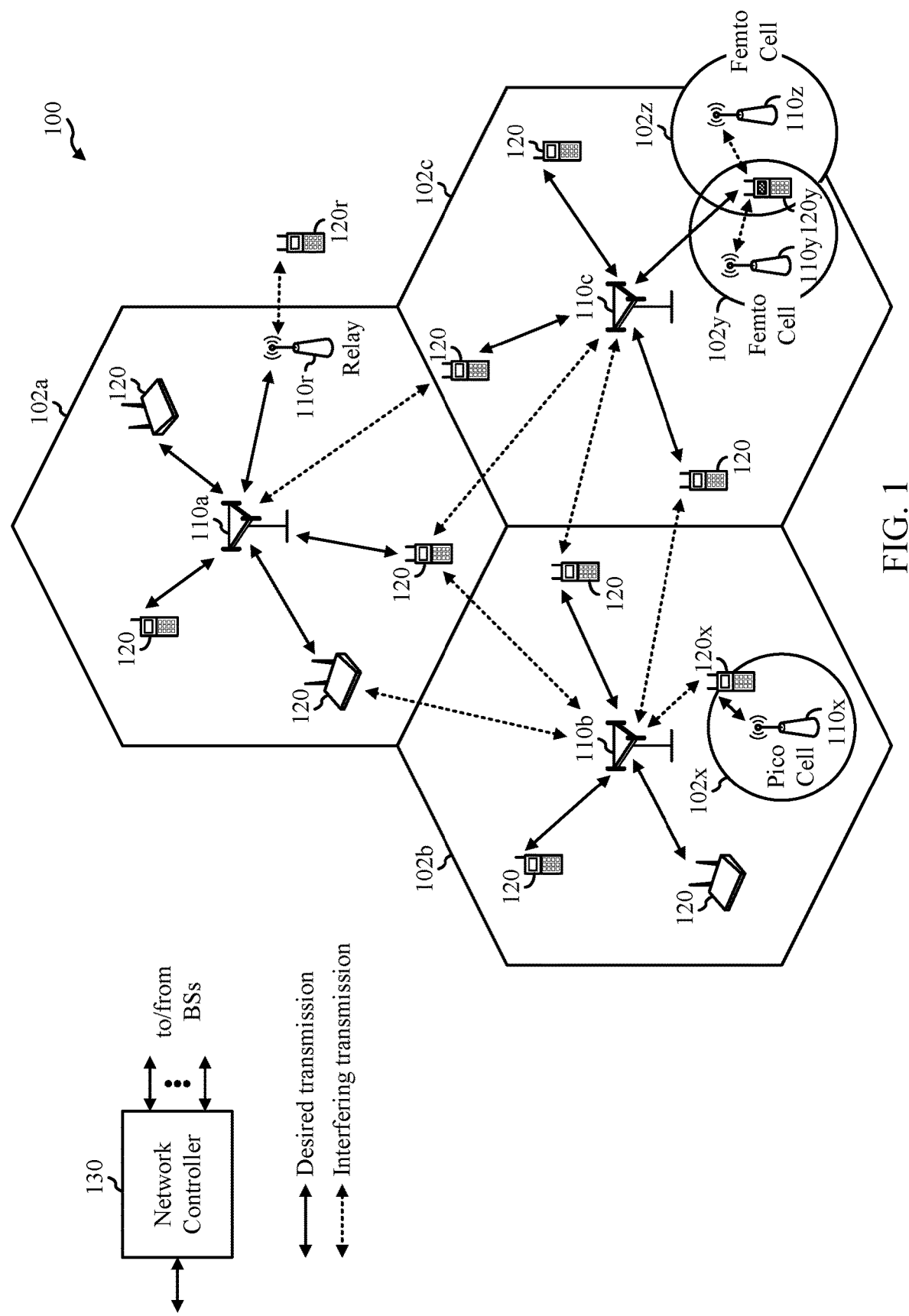
FIG. 1 is a block diagram conceptually illustrating an example telecommunications system, in accordance with certain aspects of the present disclosure.

Aspects of the present disclosure relate to methods and apparatus relating to local area data network connectivity.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

5G or NR Systems may provide support for the UEs (e.g., UE 120) to connect to a local area data network (LADN) reachable within a certain area. In order to enable the UE 120 to connect to the LADN, the 5G system may send a notification to the UE including information about the LADN and its availability, etc. In some embodiments, based on the LADN information received in the notification, the UE 120 may then establish a PDU session to the LADN while the UE 120 is located in the area. Certain embodiments described herein relate to details of what information (e.g. granularity of location) is provided to the UE 120, when it is provided, and how it is provided. In addition, certain embodiments described herein relate to how an LADN PDU session is treated or managed as the UE 120 moves in and out of the LADN's area of availability. As an example, when the UE 120 moves outside the LADN's area of availability, the PDU session may be suspended or released.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
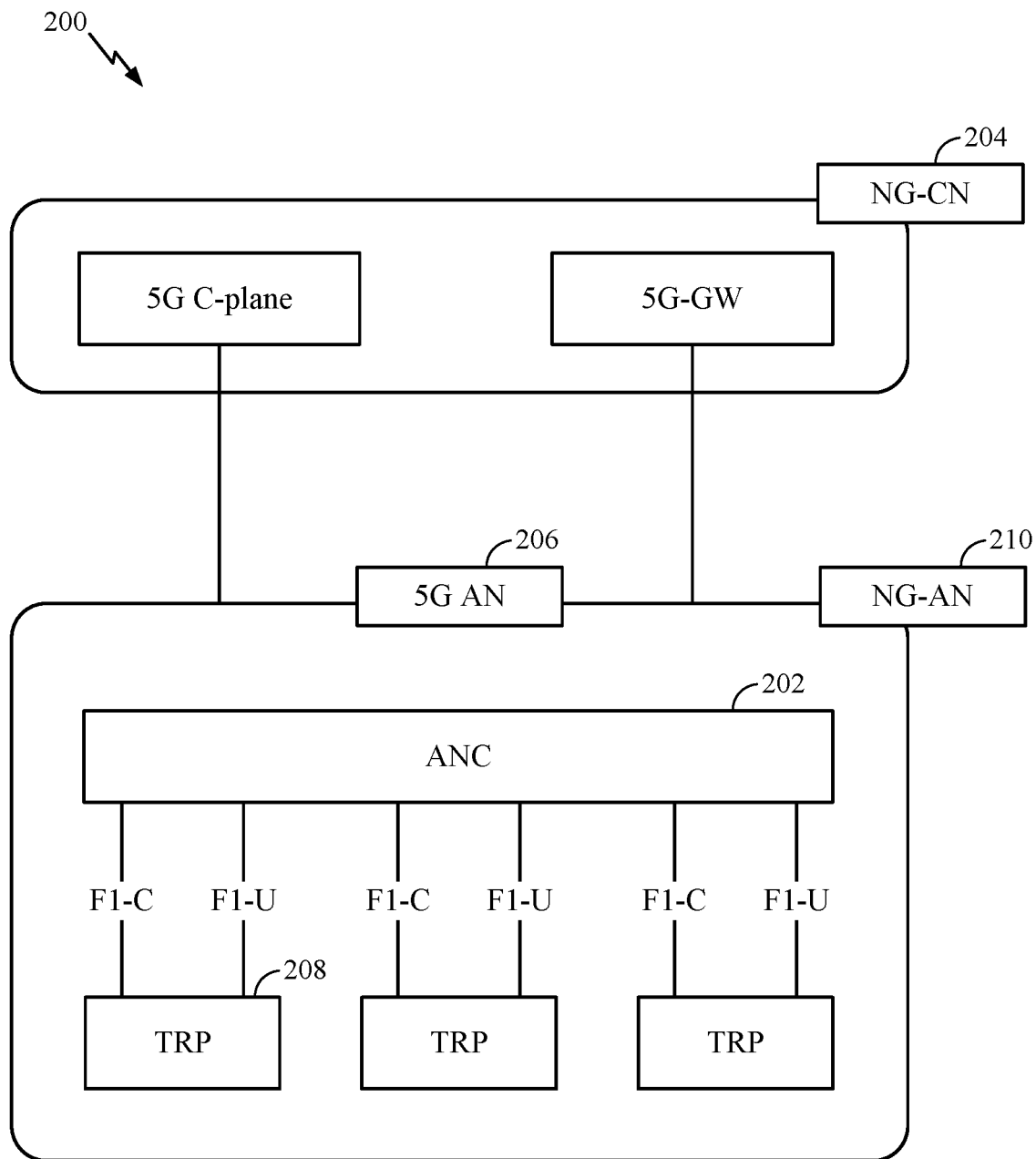
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
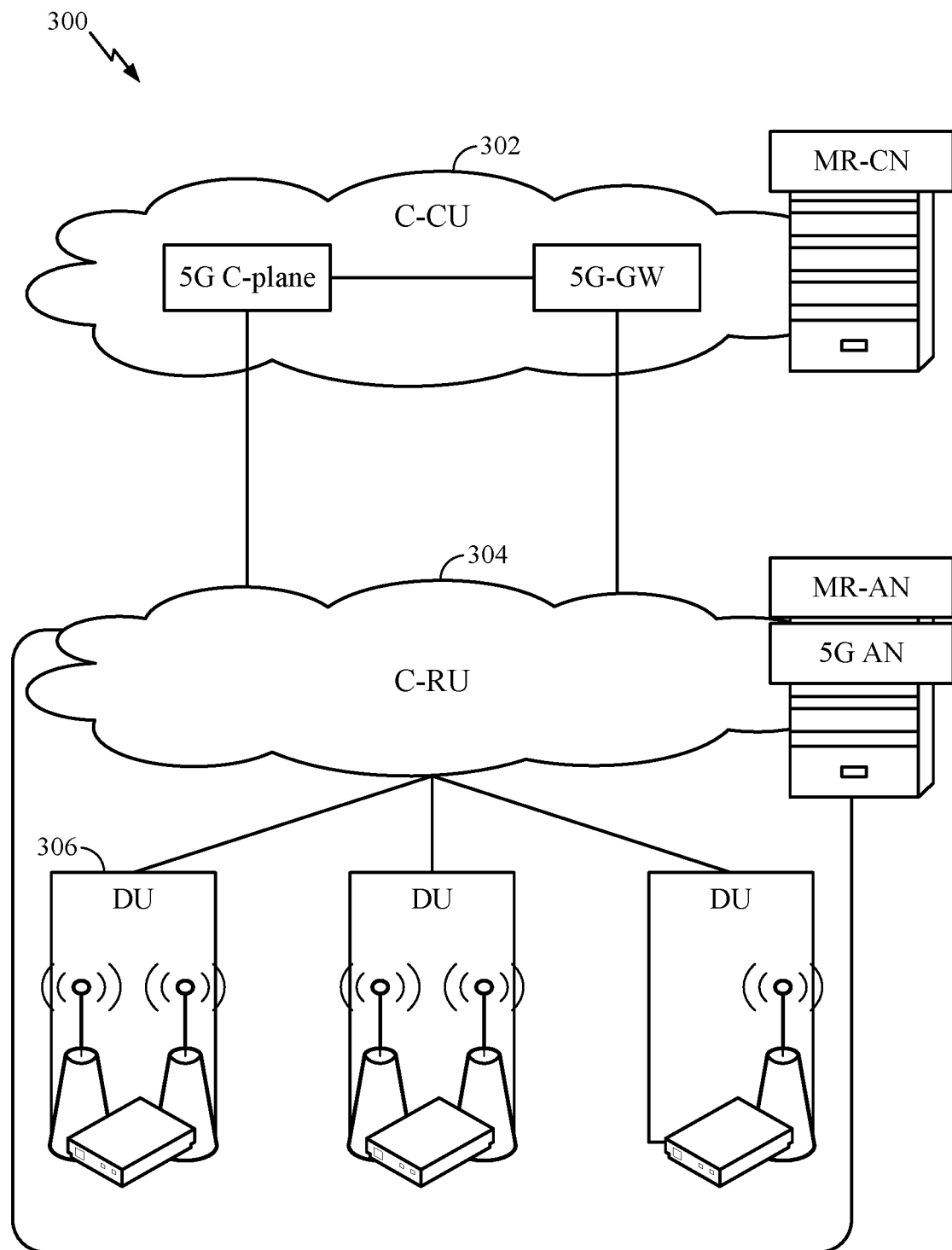
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
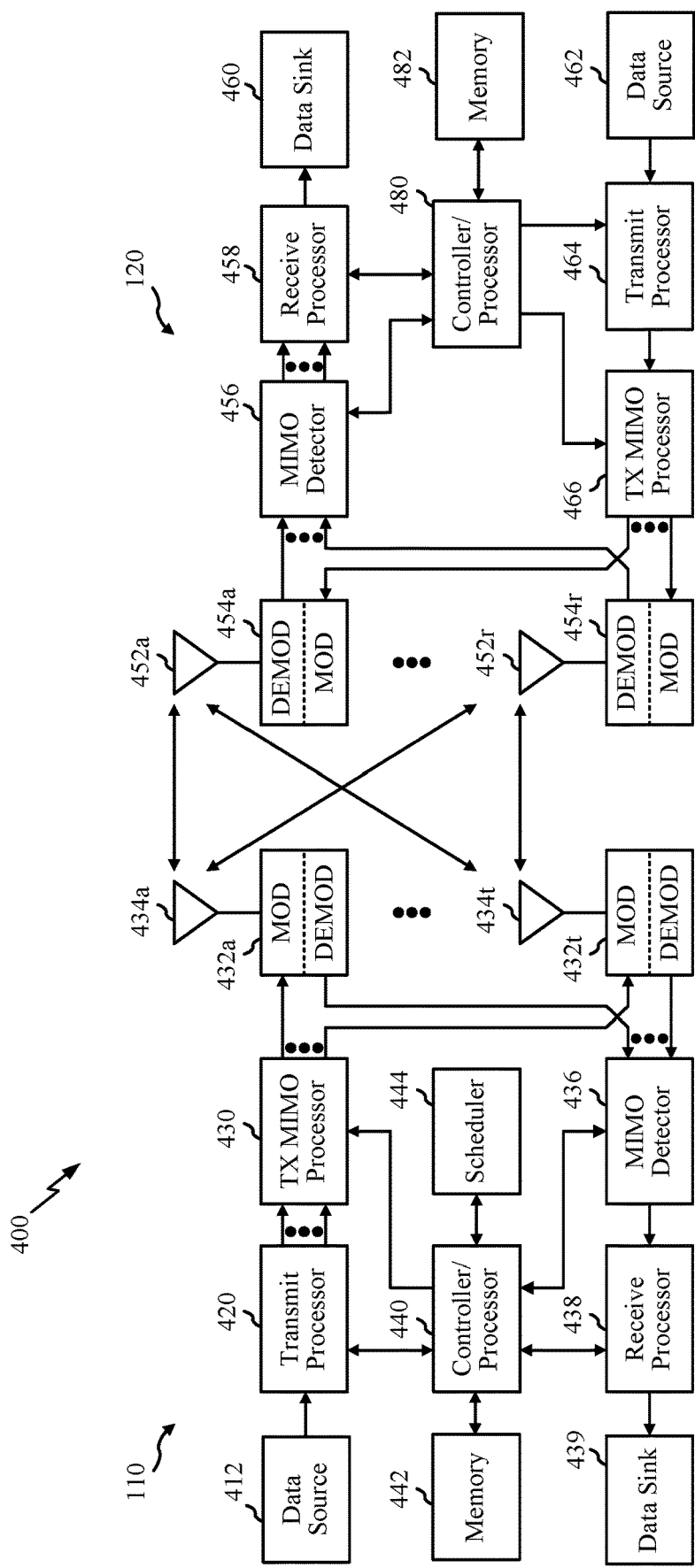
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 13-16.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 13-16, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
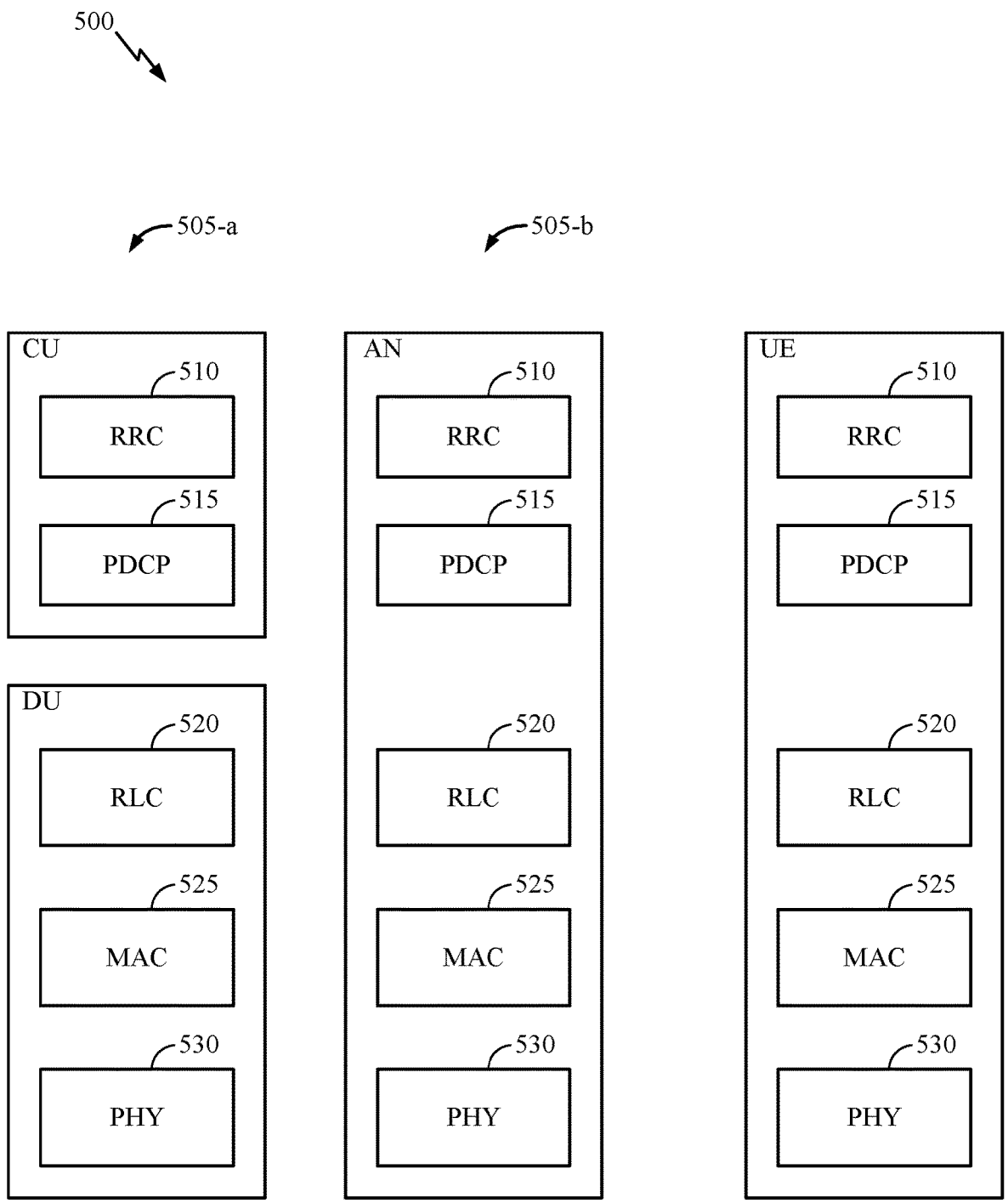
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
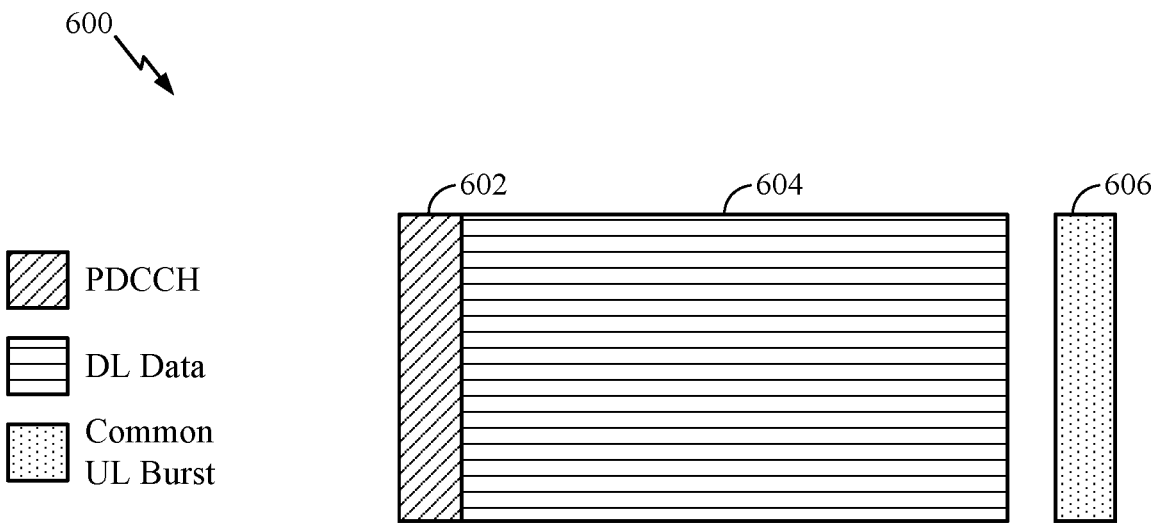
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
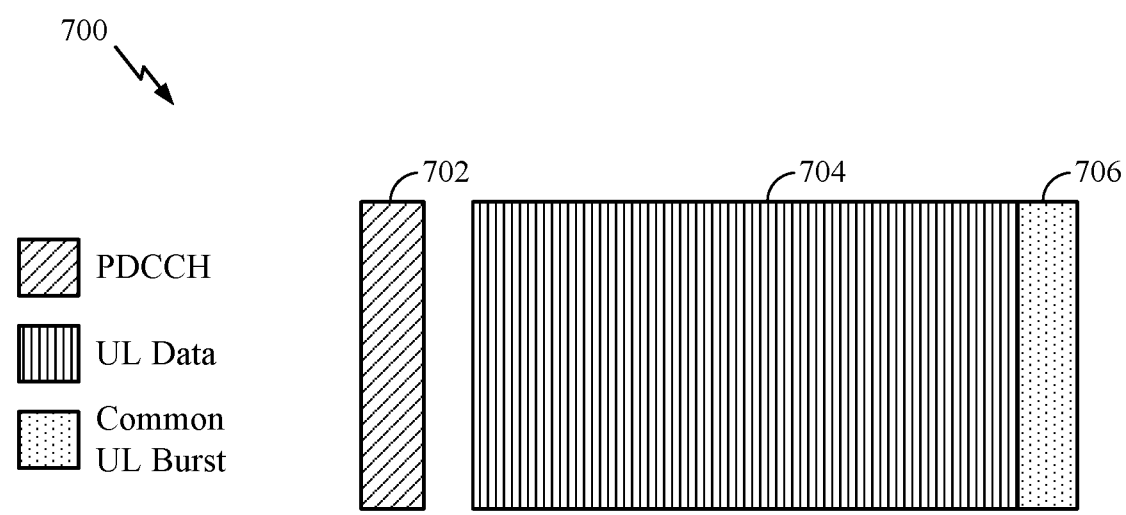
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example 5G System Architecture

Systems, such as 5G systems, may support Local Area Data Networks (LADN). A LADN, is a Data Network (DN) available only in certain locations/areas (e.g., cells). A DN may provide one or more services such as operator services, Internet access, 3rd party services, etc., to a UE (e.g., UE 120) connected to the DN. For example, a particular infrastructure available at a particular location (e.g., enterprise campus, college campus, etc.) may provide a LADN with services accessible to only UEs connected to the LADN (e.g., connected to a cell of the LADN).

In certain aspects, the core network notifies the UE of the information for the specific LADNs which are available to the UE, and the UE requests to establish a protocol data unit (PDU) session (i.e. an association between the UE and a data network) with an available LADN while the UE is located in the area of the LADN.

Figure 8:
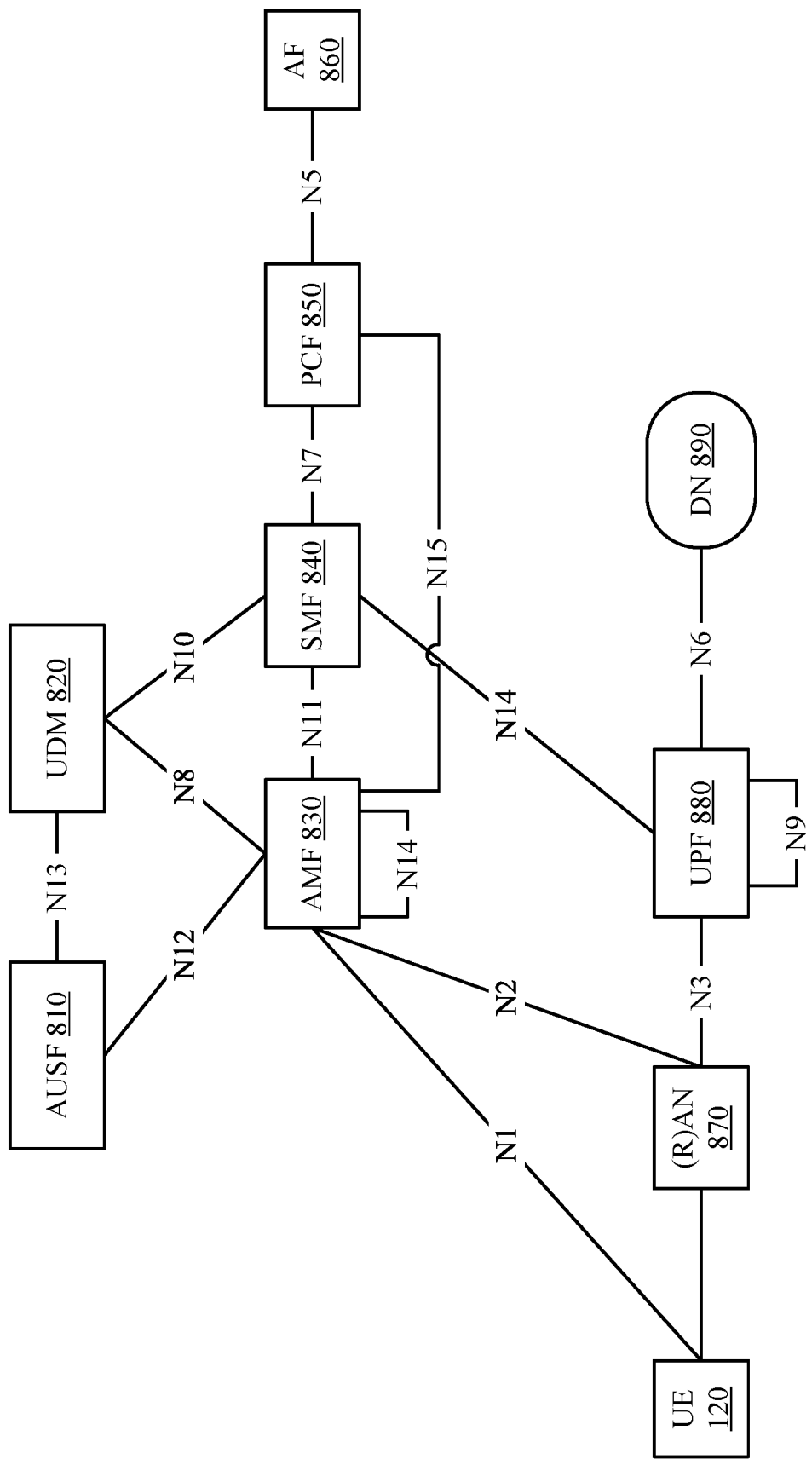
FIG. 8 illustrates example non-roaming 5G system architecture, in accordance with certain aspects of the present disclosure.

FIG. 8 illustrates example non-roaming 5G system architecture, where the AUSF 810 is an Authentication Server Function (AUSF), UDM 820 is User Data Management (UDM), the AMF 830 is Access and Mobility Management Function (AMF), the SMF 840 is Session Management Function (SMF), PCF 850 is Point Coordination Function (PCF), AF 860 is Application Function (AF), UE 120 is User Equipment, (R)AN 870 is Radio Access Network (RAN), UPF 880 is User Plane Function (UPF), and DN 890 is data network.

Figure 9:
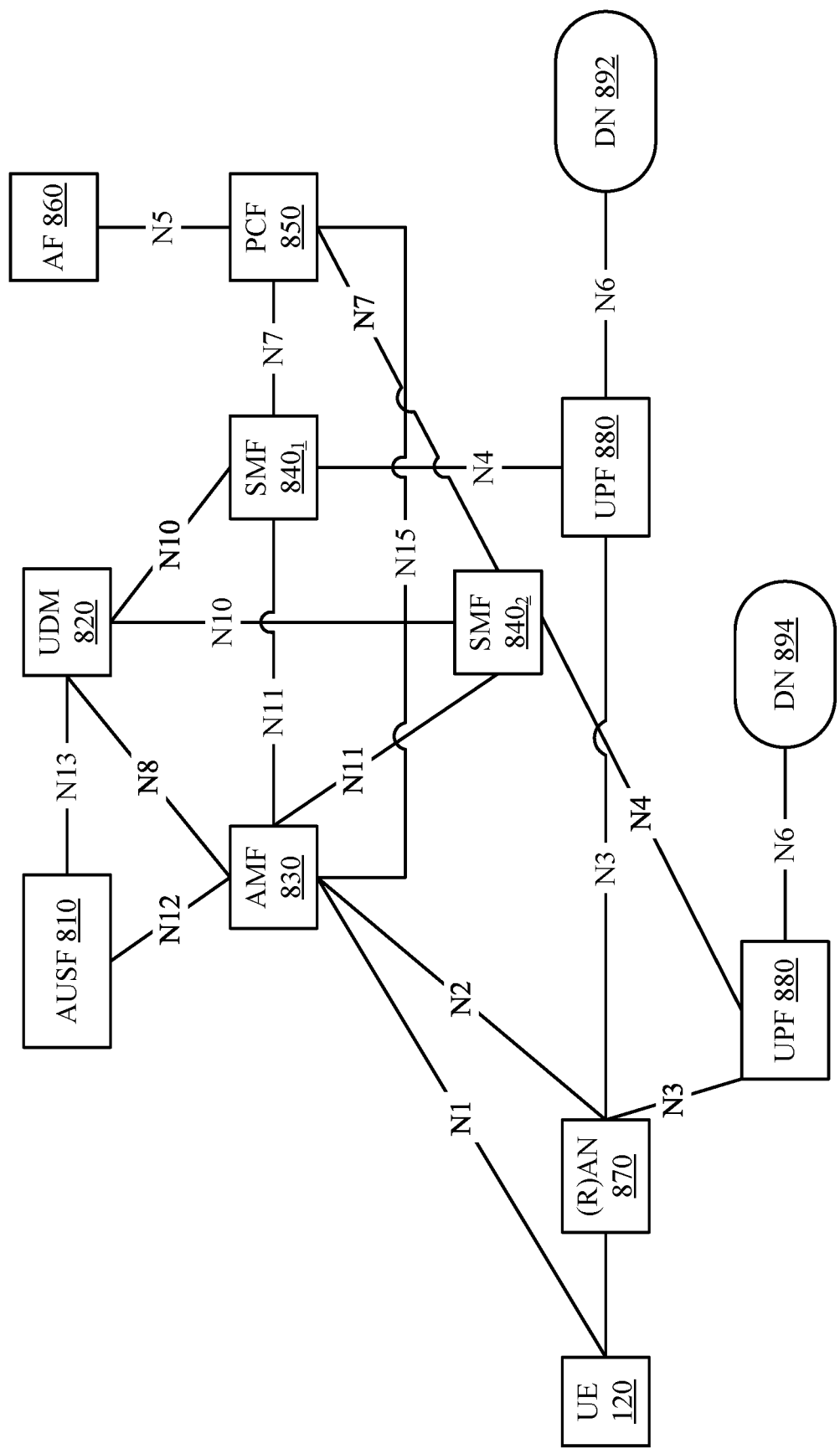
FIG. 9 illustrates example non-roaming 5G system architecture for UE(s) concurrently accessing two (e.g. local and central) data networks using multiple PDU sessions, in accordance with certain aspects of the present disclosure.
Figure 10:
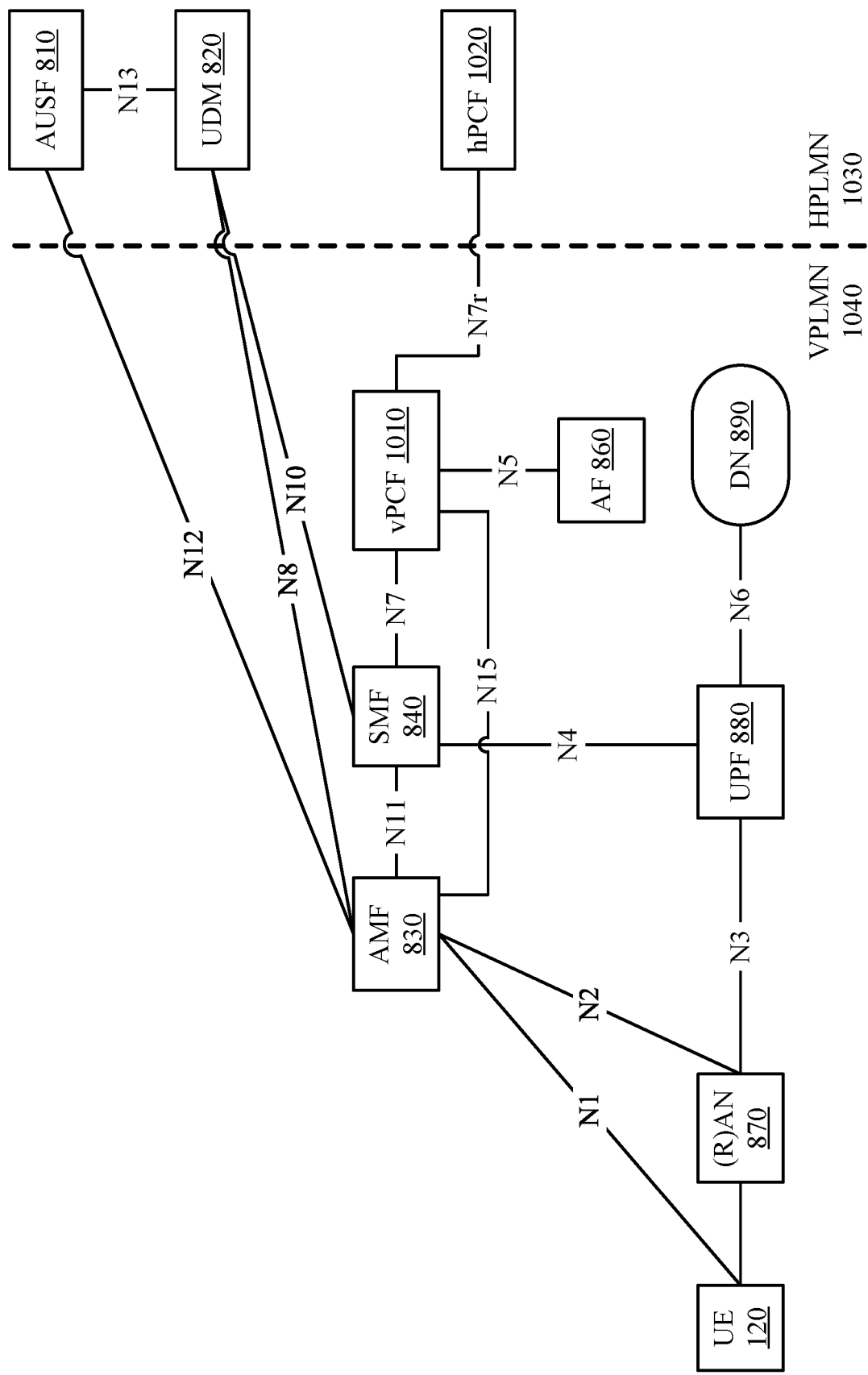
FIG. 10 illustrates example roaming 5G system architecture in cases where there is a local break out with AF in VPLMN, in accordance with certain aspects of the present disclosure.
Figure 11:
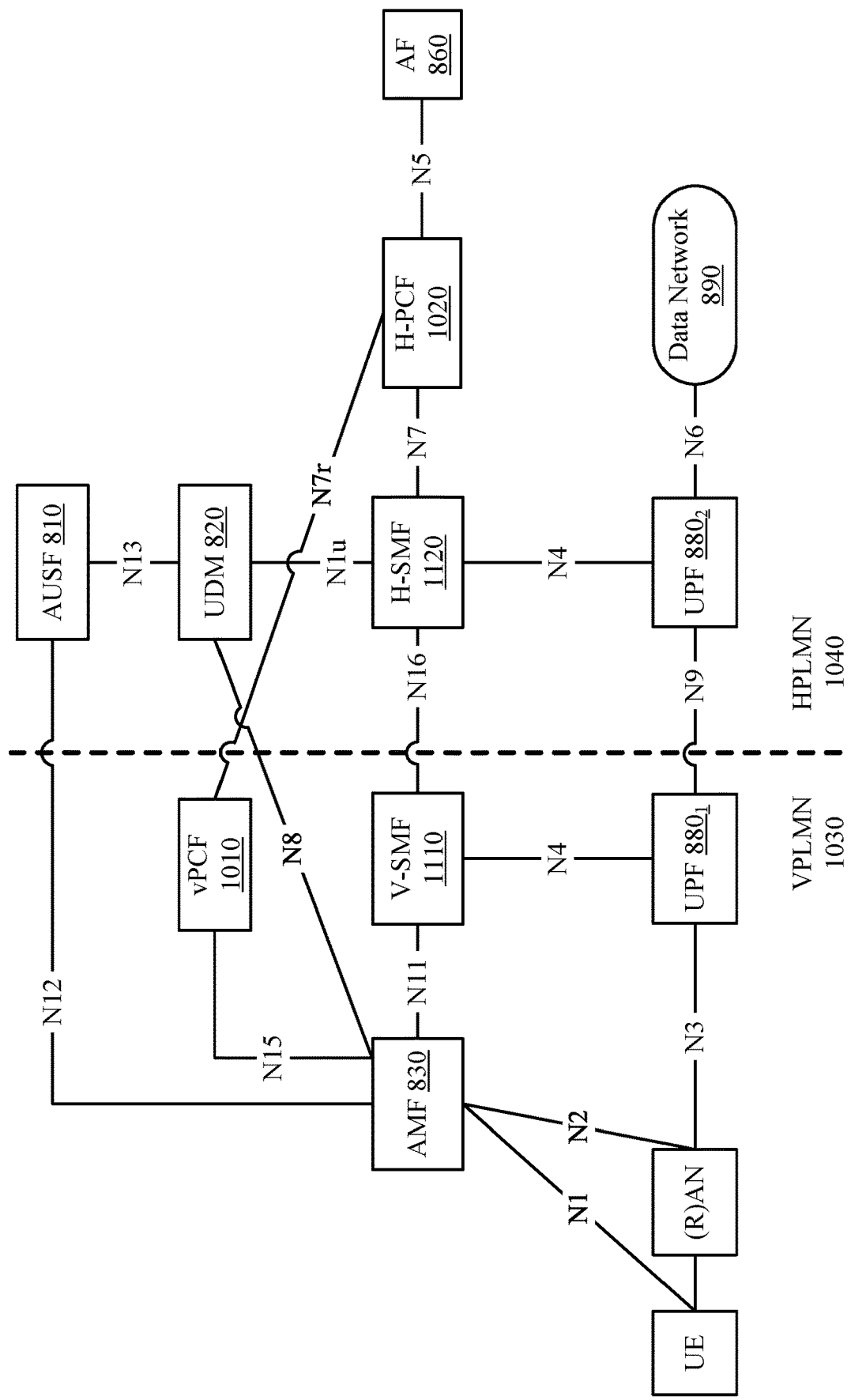
FIG. 11 illustrates example roaming 5G system architecture in a home routed scenario using the reference point representation, in accordance with certain aspects of the present disclosure.

FIG. 9 illustrates example non-roaming 5G system architecture for UE(s) concurrently accessing two (e.g. local and central) data networks (i.e., data networks 892 and 894) using multiple PDU sessions. FIG. 9 shows the architecture for multiple PDU sessions where two SMFs 8401 and 8402 are selected for the two different PDU sessions. FIG. 10 illustrates example roaming 5G system architecture in cases where there is a local break out with AF in a visited public land mobile network (VPLMN) 1040. V-PCF or vPCF 1010 refers to a visitor PCF, H-PCF or hPCF 1020 refers to a home PCF, and HPLMN 1030 refers to a home public land mobile network. FIG. 11 illustrates example roaming 5G system architecture in a home routed scenario using the reference point representation. V-SMF 1110 refers to a visitor SMF, and H-SMF 1120 refers to a home SMF.

Example Connection Management for 5G User Equipments

Connection management (CM) comprises the functions of establishing and releasing a signaling connection between a UE and the Access and Mobility Management Function (AMF) over N1. This signaling connection is used to enable non-access stratum (NAS) signaling exchange between the UE and the core network. It comprises both the access network (AN) signaling connection between the UE and the AN (e.g. radio resource control (RRC) connection over 3GPP access) and the N2 connection for this UE between the AN and the AMF.

In some embodiments, the UE may be in two CM states that reflect the NAS signaling connectivity of the UE with the AMF. The CM states are CM-IDLE and CM-CON- NECTED. In a CM-IDLE case, in some embodiments, the UE may have no NAS signaling connection established with the AMF over N1. In such embodiments, the UE may perform cell selection, cell reselection and public land mobile network (PLMN) selection. In addition, in such embodiments, there may be no N2 and N3 connections for the UE in the CM-IDLE state.

In the CM-IDLE state, the UE may perform one or more of the following actions. In some embodiments, the UE may respond to paging, if received, by performing a service request procedure. In some embodiments, the UE may perform a service request procedure when the UE has uplink signaling or user data to be sent. In some embodiments, the UE may enter the CM-CONNECTED state whenever an AN signaling connection is established between the UE and the AN (e.g. entering RRC Connected state over 3GPP access). The transmission of an Initial NAS message (Registration Request, Service Request or Deregistration Request) may initiate the transition from the CM-IDLE state to the CM-CONNECTED state. In the CM-IDLE state, the AMF may also perform one or more of the following actions. In some embodiments, the AMF may perform a network triggered service request procedure when it has signaling or mobile-terminated data to be sent to the UE, by sending a Paging Request to the UE. In some embodiments, the AMF may enter CM-CONNECTED whenever an N2 connection is established for the UE between the AN and the AMF.

In the CM-CONNECTED state, the UE may have a NAS signaling connection with the AMF over N1. In the CM-CONNECTED state, in some embodiments, the UE may enter CM-IDLE state whenever the AN signaling connection is released (e.g. entering RRC Idle state over 3GPP access). In the CM-CONNECTED state, in some embodiments, the AMF may enter the CM-IDLE state whenever the N2 signaling connection for the UE is released. In some embodiments, upon the completion of a NAS signaling procedure, the AMF may decide to release the NAS signaling connection with the UE, after which the state at both the UE and the AMF may be changed to CM-IDLE. In some embodiments, the AMF may keep a UE in CM-CONNECTED state until the UE de-registers from the core network.

Figure 12:
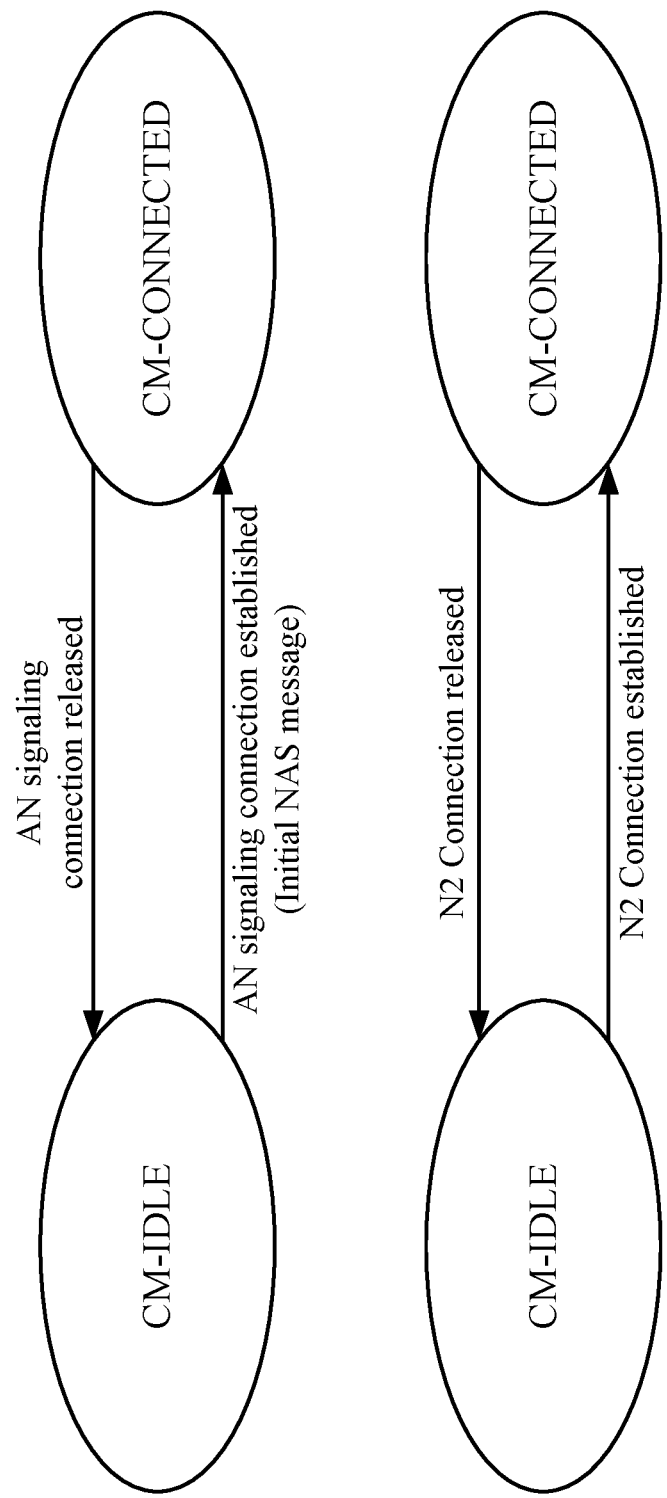
FIG. 12 illustrates example connection management state models, in accordance with certain aspects of the present disclosure.

FIG. 12 further illustrates example connection management state models. In some embodiments, when a UE becomes CM-IDLE over an access, the user plane (UP) connection of the PDU sessions that were active on the access may go inactive. In addition to the connection management states, certain embodiments described herein relate to NAS signaling connection management. In some embodiments, NAS signaling connection management may include the functions of establishing and releasing a NAS signaling connection. In regards to NAS signaling connection establishment, in some embodiments, an NAS signaling connection establishment function may be provided by the UE and the AMF to establish an NAS signaling connection for a UE in CM-IDLE state. In some embodiments, when the UE in the CM-IDLE state needs to transmit an NAS message, the UE may initiate a Service Request or a registration procedure to establish a signaling connection to the AMF.

Also, in some embodiments, based on UE preferences, UE subscription, UE mobility pattern and network configuration, the AMF may keep the NAS signaling connection until the UE de-registers from the network. In regards to NAS signaling connection release, in some embodiments, the procedure of releasing an NAS signaling connection is initiated by the 5G (R)AN node or the AMF. In some embodiments, the UE may assume the NAS signaling connection is released if it detects the RRC connection is released. After the NAS signaling connection is released, in some embodiments, the UE and the AMF may enter the CM-IDLE state.

Example System Functionality

System functionality may include registration and connection management. Registration management may be used to setup and release a signaling relation between the UE and the network and establish the user context in the network. More specifically, in some embodiments, a UE/user may need to register with the network to receive services that require registration. In some embodiments, to register to the selected PLMN, the UE may initiate an initial registration procedure. Also, in some embodiments, the UE may initiate a periodic registration procedure upon the expiry of the periodic registration timer in order to maintain reachability. In addition, in some embodiments, the UE may initiate a registration procedure upon mobility (e.g. enters new tracking area (TA)) with the network to track the UE location and for reachability.

In addition to registration management, system functionality may include connection management, which as described above, may be used to establish and release the signaling connection between the UE and the AMF to provide signaling connectivity. The 5GS Connection Management (CM) states, CM-IDLE and CM-CONNECTED, describe the signaling connectivity between the UE and the AMF.

A UE may be in a 5G CM-IDLE state when no NAS signaling connection between UE and AMF exists. In CM-IDLE state, in some embodiments, the UE may perform cell selection/reselection and PLMN selection. In addition, in some embodiments, the UE in the CM-IDLE state may respond to paging by performing a service request procedure and perform a service request procedure when the UE has uplink signaling or user data to be sent.

Unlike the CM-IDLE state, the UE and the AMF may enter the CM-CONNECTED state when the NAS signaling connection is established between the UE and the AMF. Initial NAS messages that initiate a transition from CM-IDLE to CM-CONNECTED state may, in some embodiments, include a Registration Request, Service Request or De-Registration Request. In some embodiments, the UE may be in the CM-CONNECTED state when a signaling connection between the UE and the AMF exists. In some embodiments, the UE in the CM-CONNECTED state may perform a registration procedure when the TA in the received system information is not in the list of TAs that the UE registered with the network.

In some embodiments, the UE may need to register with the network to be authorized to receive services, to enable mobility tracking, and to enable reachability. In some embodiments, the registration procedure may be used, for example, when the UE needs to initially register to the 5G system (in the mobility procedure when the UE changes to a new TA in idle mode) and when the UE performs a periodic update (due to a predefined time period of inactivity), etc.

Example Local Area Data Network Connectivity

As described above, 5G Systems may provide support for the UEs to connect to a LADN reachable within a certain area. In order to enable the UE to connect to the LADN, the 5G system may send a notification to the UE including information about the LADN and its availability, etc. In some embodiments, based on the LADN information received in the notification, the UE may then establish a PDU session to the LADN while the UE is located in the area. Certain embodiments described herein relate to details of what information (e.g. granularity of location) is provided to the UE, when it is provided, and how it is provided.

Figure 13:
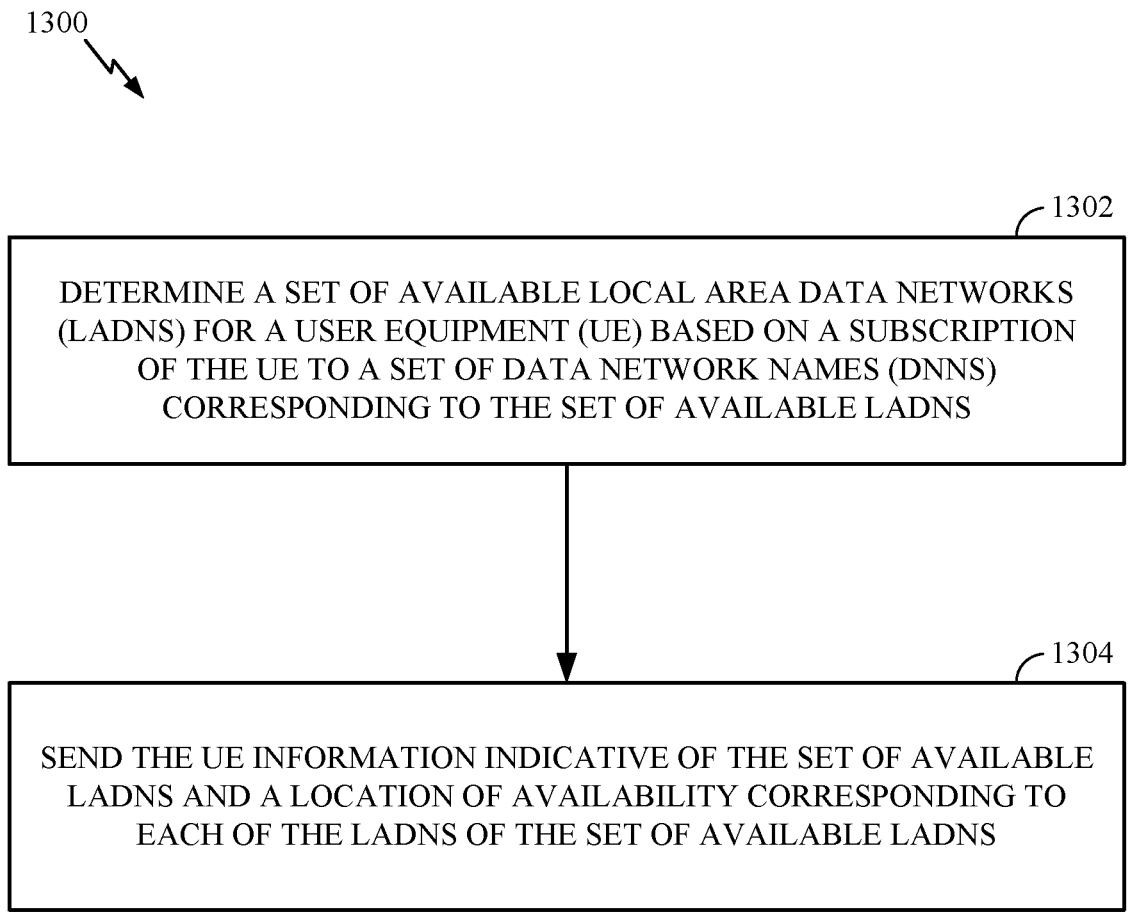
FIG. 13 illustrates example operations for use by an access and mobility management function (AMF), in accordance with aspects of the present disclosure.

FIG. 13 illustrates example operations 1300 for wireless communications by a network device, according to aspects of the present disclosure. The network device performing operations 1300 may be, for example, an access and mobility management function (AMF). Operations 1300 begin, at 1302, by determining a set of available local area data networks (LADNs) for a user equipment (UE) based on a subscription of the UE to a set of data network names (DNNs) corresponding to the set of available LADNs. At 1304, operations 1300 continue by sending the UE information indicative of the set of available LADNs and a location of availability corresponding to each of the LADNs of the set of available LADNs.

Figure 13A:
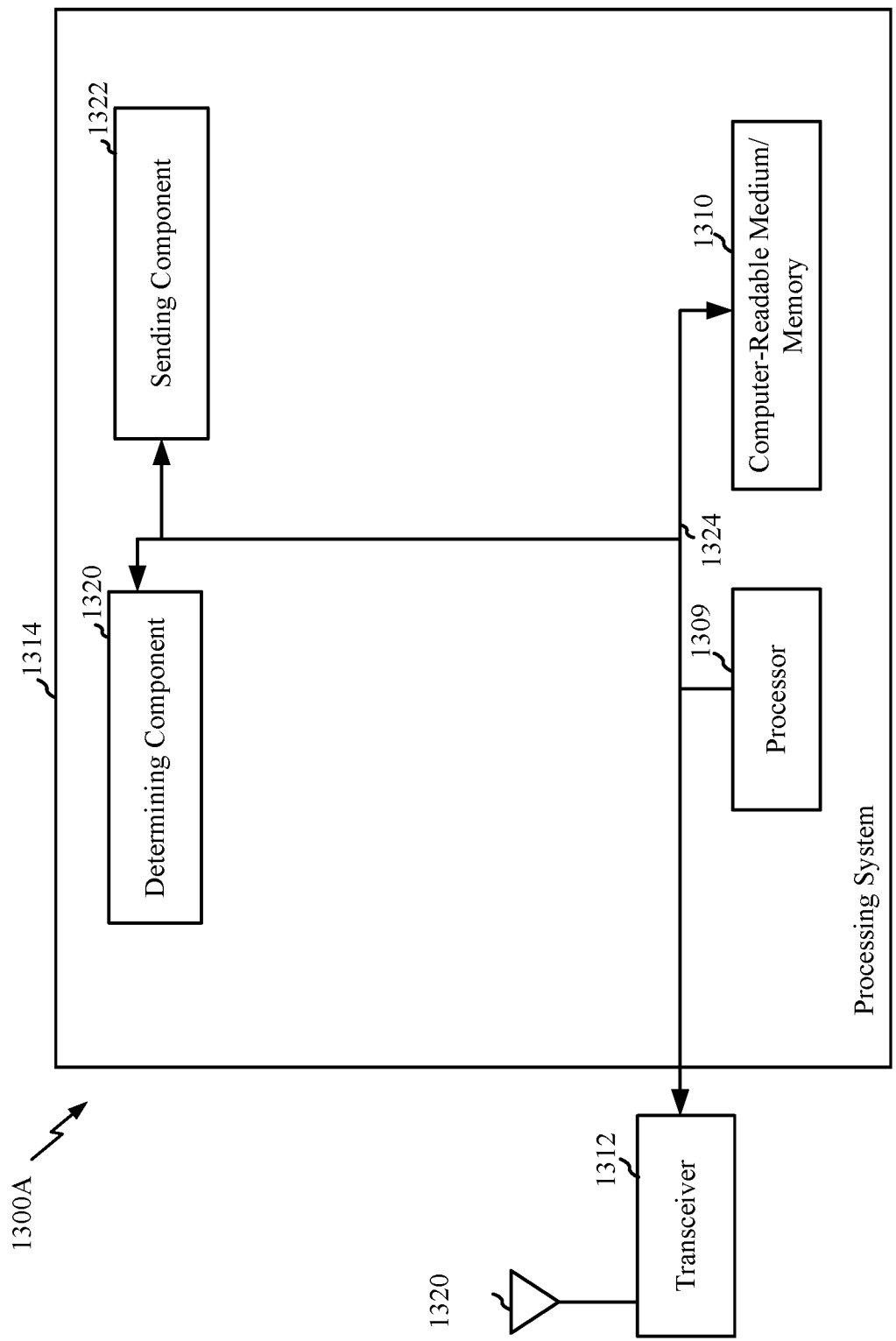
FIG. 13A illustrates a communications device that may include various components configured to perform the operations of FIG. 13, in accordance with aspects of the present disclosure.

FIG. 13A illustrates a communications device 1300A (i.e., AMF) that may include various components (e.g., corresponding to means-plus-function components) configured to perform operations for the techniques disclosed herein, such as one or more of the operations illustrated in FIG. 13. The communications device 1300A includes a processing system 1314 coupled to a transceiver 1312. The transceiver 1212 is configured to transmit and receive signals for the communications device 1300A via an antenna 1320. The processing system 1314 may be configured to perform processing functions for the communications device 1300A, such as processing signals, etc.

The processing system 1314 includes a processor 1309 coupled to a computer-readable medium/memory 1310 via a bus 1324. In certain aspects, the computer-readable medium/memory 1310 is configured to store instructions that when executed by processor 1309, cause the processor 1309 to perform one or more of the operations illustrated in FIG. 13, or other operations for performing the various techniques discussed herein.

In certain aspects, the processing system 1314 further includes a determining component 1320 for performing one or more of the operations illustrated at 1302 in FIG. 13. Additionally, the processing system 1314 includes a sending component 1322 for performing one or more of the operations illustrated at 1304 in FIG. 13.

The determining component 1320 and the sending component 1322 may be coupled to the processor 1309 via bus 1324. In certain aspects, the determining component 1320 and the sending component 1322 may be hardware circuits. In certain aspects, the determining component 1320 and the sending component 1322 may be software components that are executed and run on processor 1309.

Figure 14:
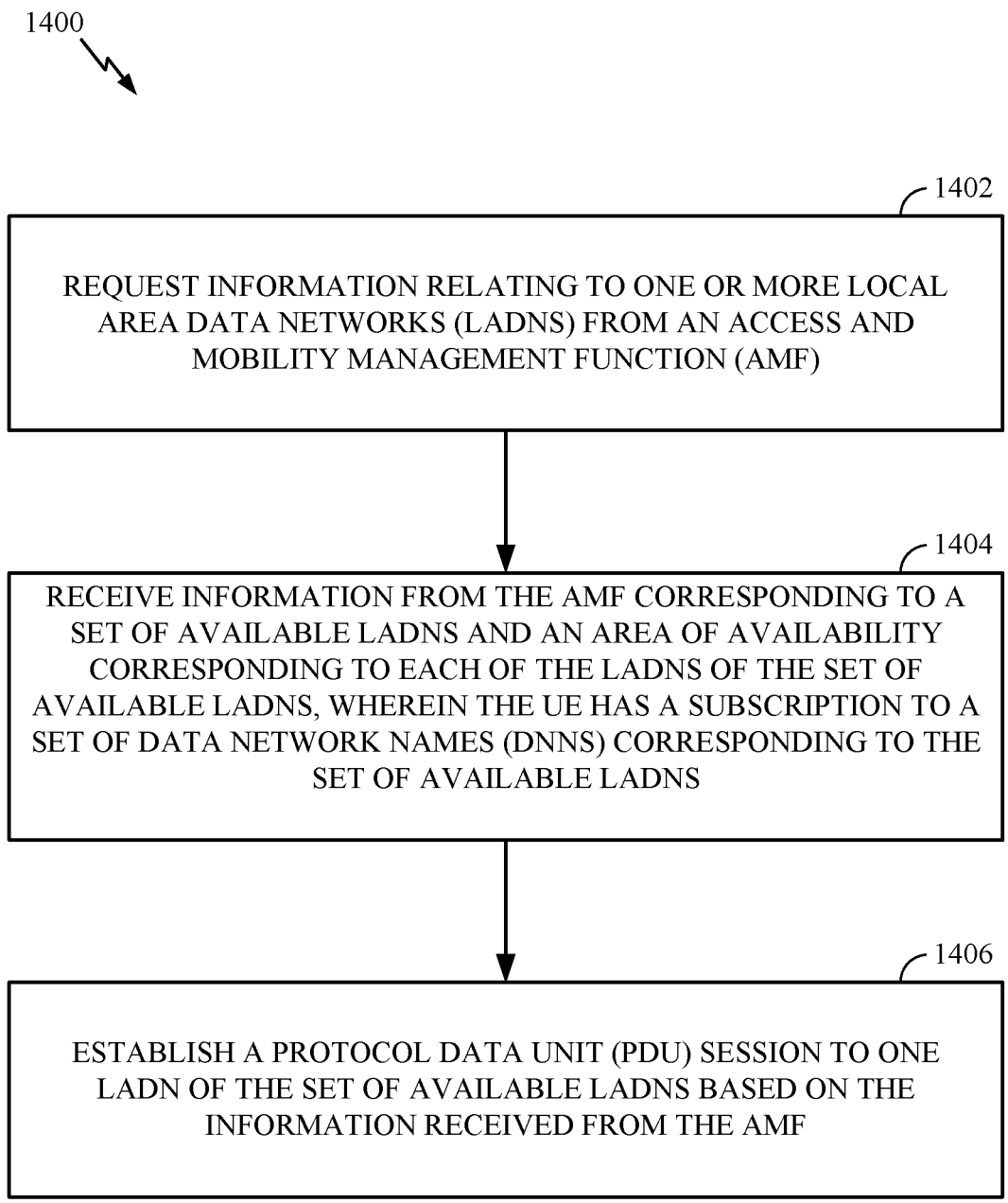
FIG. 14 illustrates example operations for use by a UE, in accordance with aspects of the present disclosure.

FIG. 14 illustrates example operations 1400 for wireless communications by a wireless device, according to aspects of the present disclosure. The wireless device performing operations 1400 may be, for example, a UE. Operations 1400 begin, at 1402, by requesting information relating to one or more local area data networks (LADNs) from an access and mobility management function (AMF). At 1404, operations 1400 continue by receiving information from the AMF corresponding to a set of available LADNs and an area of availability corresponding to each of the LADNs of the set of available LADNs, wherein the UE has a subscription to a set of data network names (DNNs) corresponding to the set of available LADNs. At 1406, operations 1400 continue by establishing a protocol data unit (PDU) session to one LADN of the set of available LADNs based on the information received from the AMF.

Figure 14A:
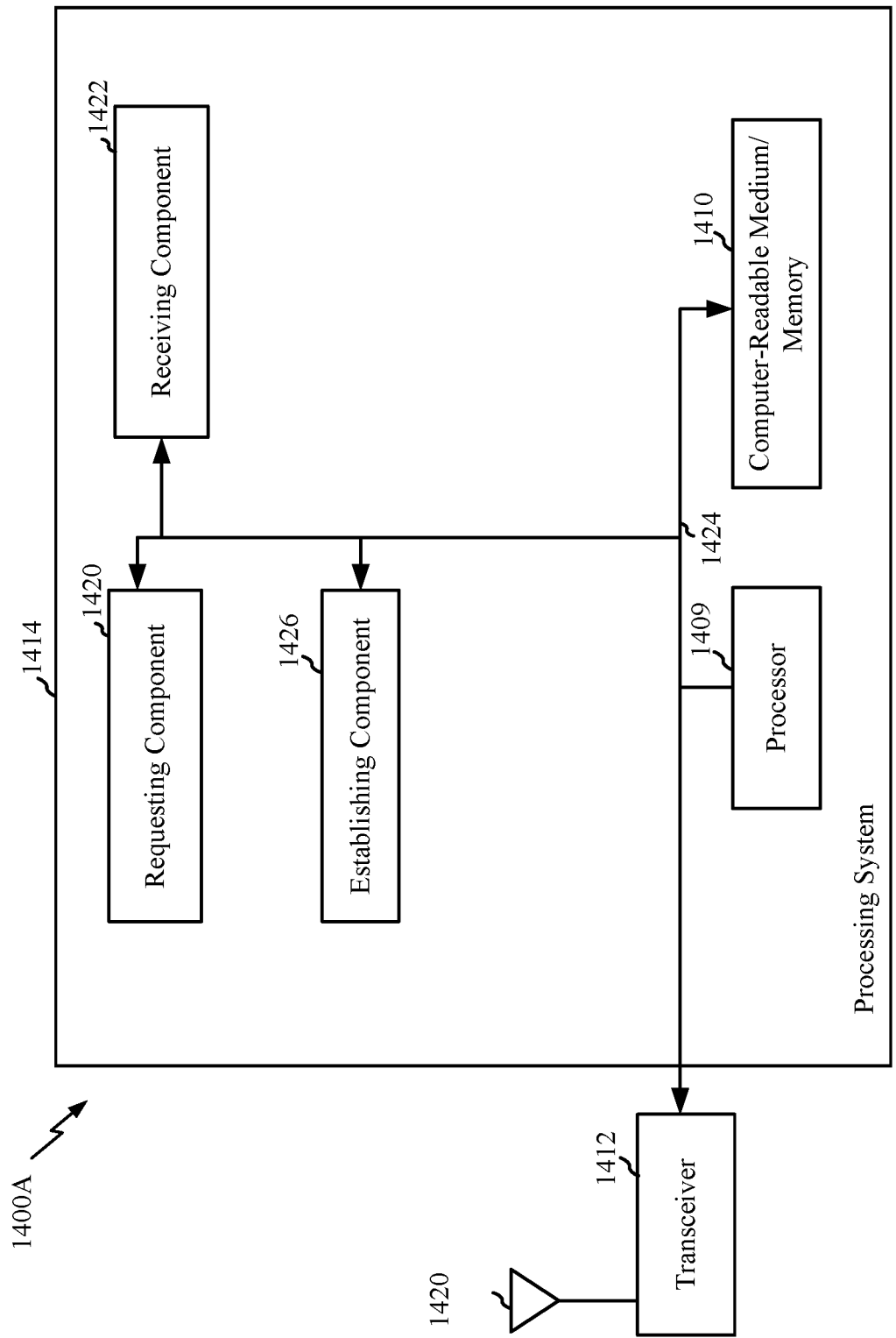
FIG. 14A illustrates a communications device that may include various components configured to perform the operations of FIG. 14, in accordance with aspects of the present disclosure.

FIG. 14A illustrates a communications device 1400A (i.e., UE 120) that may include various components (e.g., corresponding to means-plus-function components) configured to perform operations for the techniques disclosed herein, such as one or more of the operations illustrated in FIG. 14. The communications device 1400A includes a processing system 1414 coupled to a transceiver 1412. The transceiver 1412 is configured to transmit and receive signals for the communications device 1400A via an antenna 1420. The processing system 1414 may be configured to perform processing functions for the communications device 1400A, such as processing signals, etc.

The processing system 1414 includes a processor 1409 coupled to a computer-readable medium/memory 1410 via a bus 1424. In certain aspects, the computer-readable medium/memory 1410 is configured to store instructions that when executed by processor 1409, cause the processor 1409 to perform one or more of the operations illustrated in FIG. 14, or other operations for performing the various techniques discussed herein.

In certain aspects, the processing system 1414 further includes a requesting component 1420 for performing one or more of the operations illustrated at 1402 in FIG. 14. Additionally, the processing system 1414 includes a receiving component 1422 for performing one or more of the operations illustrated at 1404 in FIG. 14. Further, the processing system 1414 includes an establishing component 1426 for performing one or more of the operations illustrated at 1406 in FIG. 14.

The requesting component 1420, the receiving component 1422, and the establishing component 1426 may be coupled to the processor 1409 via bus 1424. In certain aspects, the requesting component 1420, the receiving component 1422, and the establishing component 1426 may be hardware circuits. In certain aspects, the requesting component 1420, the receiving component 1422, and the establishing component 1426 may be software components that are executed and run on processor 1409.

As described above, the embodiments described herein relate to the details of the information (e.g. granularity of location) provided to the UE by the 5G system in supporting the UE to connect to a LADN.

In some embodiments, LADN information that a UE requires may include data network (DN) identification information and DN service area information. In some embodiments, DN identification information may include the data network name (DNN) or an access point name (APN). This is so that the UE may be aware of which LADN the UE may be able to connect to. In addition, the DN service area information may be provided at the Tracking Area level or Cell ID level so that the UE may be aware of where the LADN is available. For example, the DN service area information may indicate where the LADN is available by pointing to certain tracking areas or cell IDs. A "Tracking Area" is the LTE counterpart of the location/routing area and refers to a set of cells. Tracking areas can be grouped into lists of tracking areas (TA lists), which can be configured on the UE. In addition, each cell may have a Cell ID that helps identify the cell. In some embodiments, some LADNs may be available just in a single cell (e.g. a CSG cell), in a group of cells (e.g. covering an enterprise, or a shopping mall, or an airport), an entire tracking area, or an entire registration area.

Example Providing Information to the UE

The LADN information, described above, may be provided to the UE using one or more of multiple techniques described herein. A first technique relates to policy configuration in the UE. Under the first technique, in some embodiments, the home PLMN (HPLMN) may configure the information on LADN availability via policy configuration (from the Home PCF). In such embodiments, the UE may attempt to connect to an LADN only if it is listed in the configured policy as being available in the current area. In some cases, however, this may work only for the HPLMN since the HPLMN may not be aware of LADN availability in VPLMNs.

In some embodiments, when the UE registers to a VPLMN, the UE may receive a V-PCF policy for availability of LADNs in the VPLMN. In such embodiments, the V-PCF policy may take priority over any H-PCF policy that may be configured in the UE. In such embodiments, however, an inbound roaming UE may receive a lot of information regarding LADNs that are not applicable to the inbound roaming UE, and may not be of any use to the UE at all.

In some embodiments, especially in roaming scenarios, the specific availability of LADNs in the current area may not be known to the PCF (e.g. in the HPLMN) or, in some embodiments, the PCF may not have up-to-date information relating to UPF connectivity. In such embodiments, the AMF may be kept up-to-date via operations and management (OAM) and provide more precise information. Accordingly, information from the AMF (if provided) may supersede the information included in the LADN policy obtained from the PCF. In some embodiments, therefore, if the UE receives information about LADNs from the AMF, it may ignore any information for the same LADNs that the UE may have received from the PCF.

Under a second technique, in some embodiments, the AMF may inform a UE performing a (re)registration of the list of available LADNs, including the location of the availability of each of the LADN(s). In such embodiments, the AMF may provide information based on OAM configuration in the AMF, where such information may not be per-subscriber. In such embodiments, the UE may attempt to connect to an LADN only if it is listed in the information available from the AMF. Such embodiments may be implemented in non-roaming and for roaming cases, where an HPLMN LADN is available in the VPLMN. However, in some embodiments, in case of an inbound roaming UE, as in the case of the PCF-based solution, the UE may receive a lot of information regarding LADNs that are not applicable to the inbound roaming UE, and may not be of any use to the UE at all. In such embodiments, the AMF may provide the UE with the information described above only if the UE is a roaming UE (i.e. if the UE Subscriber Permanent Identity (SUPI) indicates the UE is from another PLMN).

Under a third technique, in some embodiments, instead of the AMF providing information to the UE that is not per-subscriber, the AMF may provide the UE with information based on OAM configuration in the AMF as well as the UE subscription (i.e., provides information only for the LADNs that are supported in the area and correspond to DNNs that the UE has a subscription to). In such embodiments, the UE may attempt to connect to an LADN only if it is listed in the information available from the AMF. In such embodiments, providing information based on the UE's subscription may not cause a non-roaming UE or an inbound roaming UE to receive unnecessary information about LADNs. Accordingly, such embodiments may be implemented for both non-roaming and roaming cases, where an HPLMN LADN is available in the VPLMN. Yet, in some embodiments, the AMF may provide the information described above to the UE only if the UE is a roaming UE (i.e. if the UE Subscriber Permanent Identity (SUPI) indicates the UE is from another PLMN).

In some embodiments, the AMF may provide the UE with LADN information only if the UE explicitly requests the information by providing an indication in request messages (e.g., Registration Request). In some embodiments, a UE that is not configured for any LADNs may not request LADN information In some embodiments, upon performing a registration management or mobility management procedure, the UE may include in the request message (e.g., Registration Request) a list of LADNs supported by the UE and configured in the UE. In some embodiments, the LADNs are identified by a DNN or APN. In some embodiments, the UE may include all the LADNs supported or only a subset, e.g., only when specific services or applications are active in the UE. In some embodiments, if the AMF is configured with information about such LADNs, the AMF may return the LADN information. In such embodiments, in case of a roaming UE, the LADNs the UE is configured with may not be recognized by the visited PLMN AMF. However, in some embodiments, based on roaming agreements the VPLMN may be configured with a mapping between some of the LADNs of the HPLMN and the equivalent LADNs in the VPLMN. In such embodiments, if the AMF does not support the LADN provided by the UE but has a mapping to equivalent VPLMN LADNs, the AMF may provide the UE with the DNN or APN of the equivalent VPLMN LADN and the availability information of such LADN.

In some embodiments, when the UE receives an indication of availability for a configured LADN which includes the equivalent VPLMN LADN, the UE may then map applications and services, which were bound to the configured LADN, to the equivalent VPLMN LADN for the duration of the UE registration in the PLMN. In some other embodiments, the UE may map applications and services to the equivalent VPLMN LADN until the UE receives new information from the same serving PLMN for such LADNs.

Example LADN PDU Session Treatment

As discussed above, in the CM-IDLE state, the UE may perform a service request procedure when the UE has uplink signaling or user data to be sent. However, in some embodiments, when a PDU session to an LADN has been established and the UE moves outside the area of availability of the LADN, the UE may not be allowed to attempt to exchange user plane traffic with the LADN. In such embodiments, when the UE leaves the area of availability of a LADN, the 5G core network may make a change to the LADN PDU session, which comprises performing one or more actions including (1) LADN PDU Session Release, (2) Indefinite LADN PDU Session Suspension, or (3) LADN PDU Session Suspension.

Figure 15:
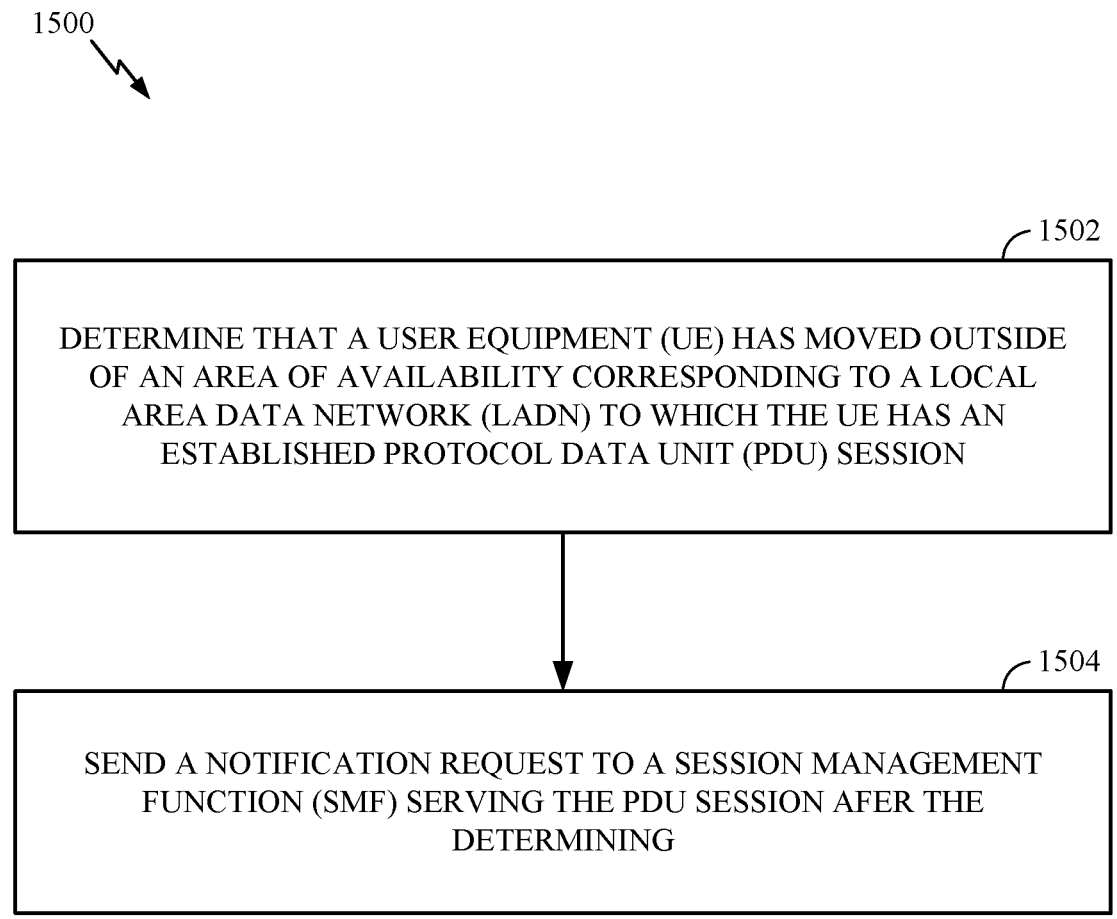
FIG. 15 illustrates example operations for use by an AMF, in accordance with aspects of the present disclosure.

FIG. 15 illustrates example operations 1500 for wireless communications by a network device, according to aspects of the present disclosure. The network device performing operations 1500 may be, for example, an AMF. Operations 1500 begin, at 1502, by determining that a user equipment (UE) has moved outside of an area of availability corresponding to a local area data network (LADN) to which the UE has an established protocol data unit (PDU) session. At 1504, operations 1500 continue by sending a notification request to a session management function (SMF) serving the PDU session after the determining.

Figure 15A:
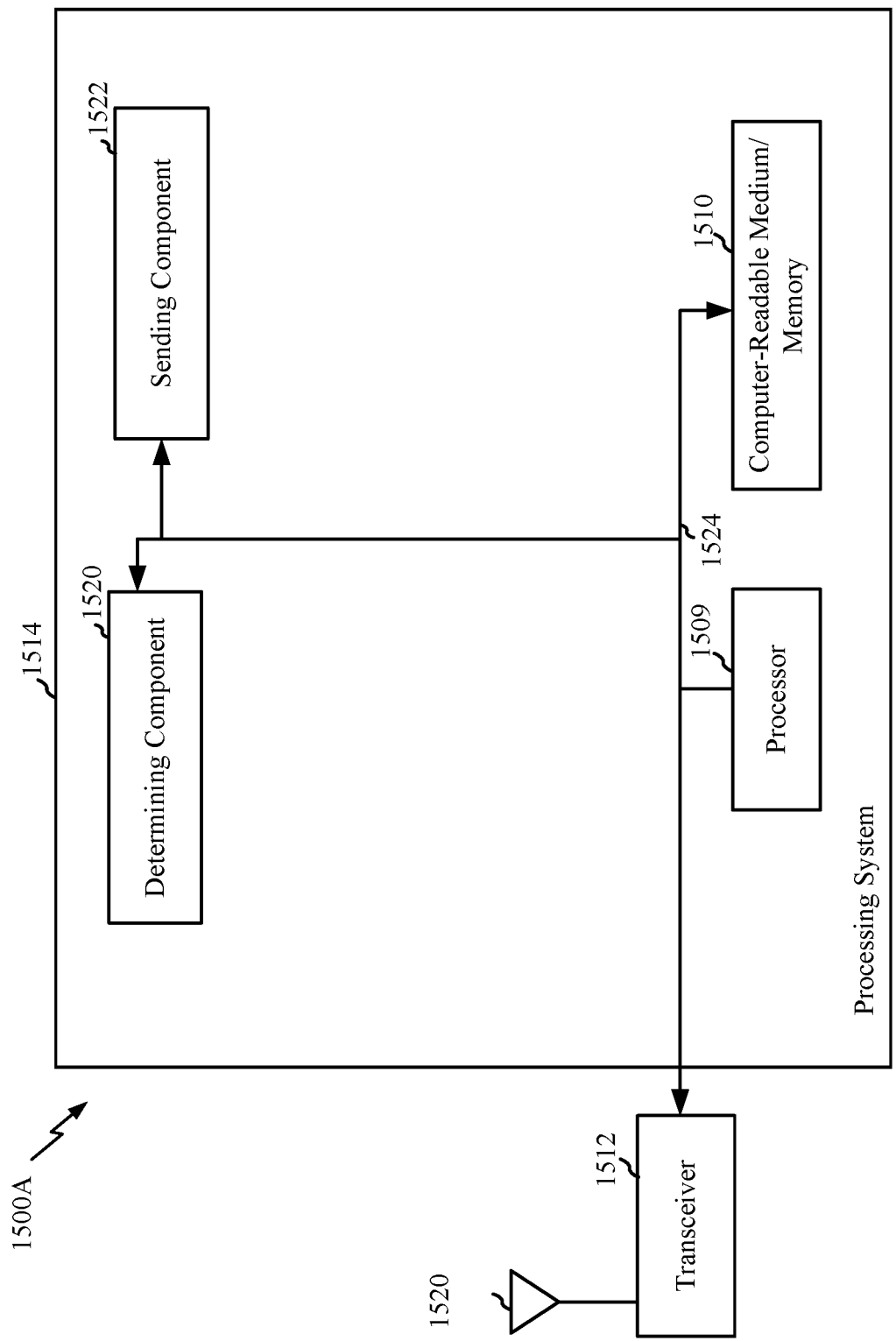
FIG. 15A illustrates a communications device that may include various components configured to perform the operations of FIG. 15, in accordance with aspects of the present disclosure.

FIG. 15A illustrates a communications device 1500A (i.e., AMF) that may include various components (e.g., corresponding to means-plus-function components) configured to perform operations for the techniques disclosed herein, such as one or more of the operations illustrated in FIG. 15. The communications device 1500A includes a processing system 1514 coupled to a transceiver 1512. The transceiver 1512 is configured to transmit and receive signals for the communications device 1500A via an antenna 1520. The processing system 1514 may be configured to perform processing functions for the communications device 1500A, such as processing signals, etc.

The processing system 1514 includes a processor 1509 coupled to a computer-readable medium/memory 1510 via a bus 1524. In certain aspects, the computer-readable medium/memory 1510 is configured to store instructions that when executed by processor 1509, cause the processor 1509 to perform one or more of the operations illustrated in FIG. 15, or other operations for performing the various techniques discussed herein.

In certain aspects, the processing system 1514 further includes a determining component 1520 for performing one or more of the operations illustrated at 1502 in FIG. 15. Additionally, the processing system 1514 includes a sending component 1522 for performing one or more of the operations illustrated at 1504 in FIG. 15.

Figure 16:
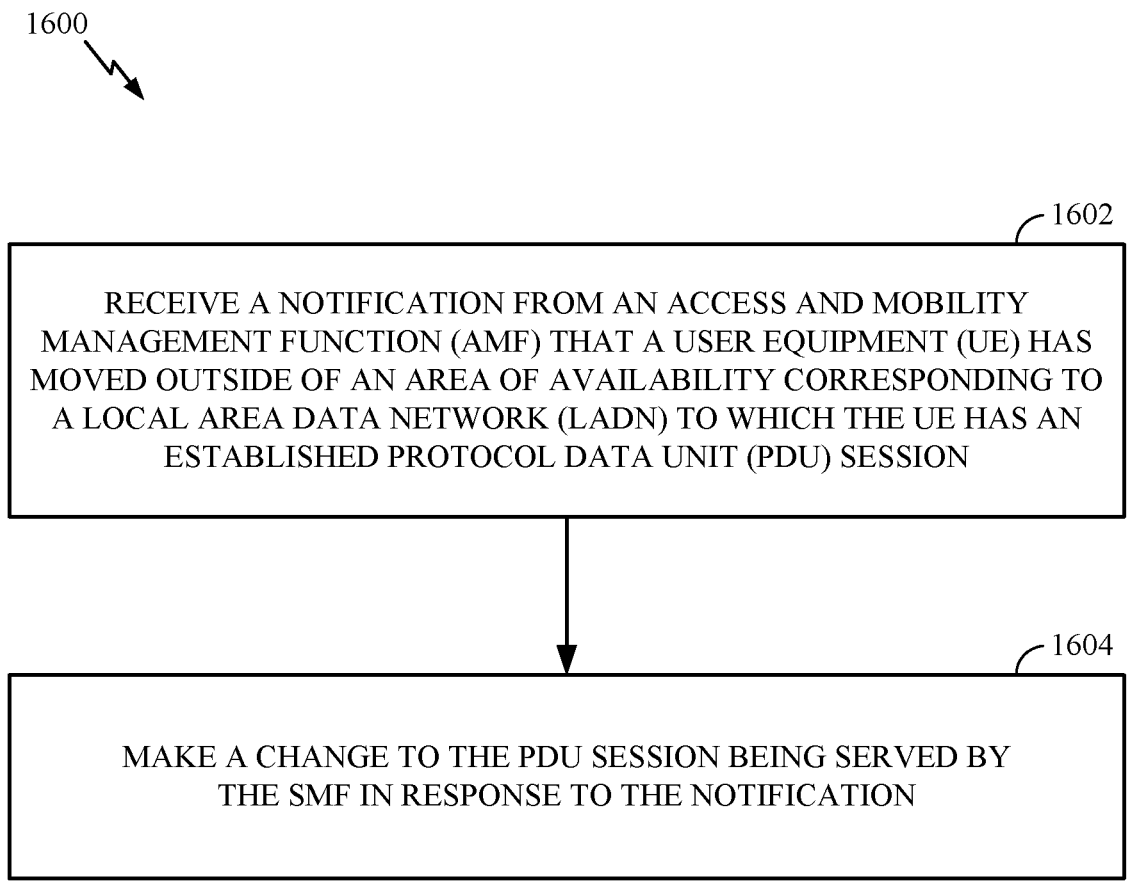
FIG. 16 illustrates example operations for use by an SMF, in accordance with aspects of the present disclosure.

The determining component 1520 and the sending component 1522 may be coupled to the processor 1509 via bus 1524. In certain aspects, the determining component 1520 and the sending component 1522 may be hardware circuits. In certain aspects, the determining component 1520 and the sending component 1522 may be software components that are executed and run on processor 1509. FIG. 16 illustrates example operations 1600 for wireless communications by a network device, according to aspects of the present disclosure. The network device performing operations 1600 may be, for example, a session management function (SMF). Operations 1600 begin, at 1602, by receiving a notification from an access and mobility management function (AMF) that a user equipment (UE) has moved outside of an area of availability corresponding to a local area data network (LADN) to which the UE has an established protocol data unit (PDU) session. At 1604, operations 1600 continue by making a change to the PDU session being served by the SMF in response to the notification.

Figure 16A:
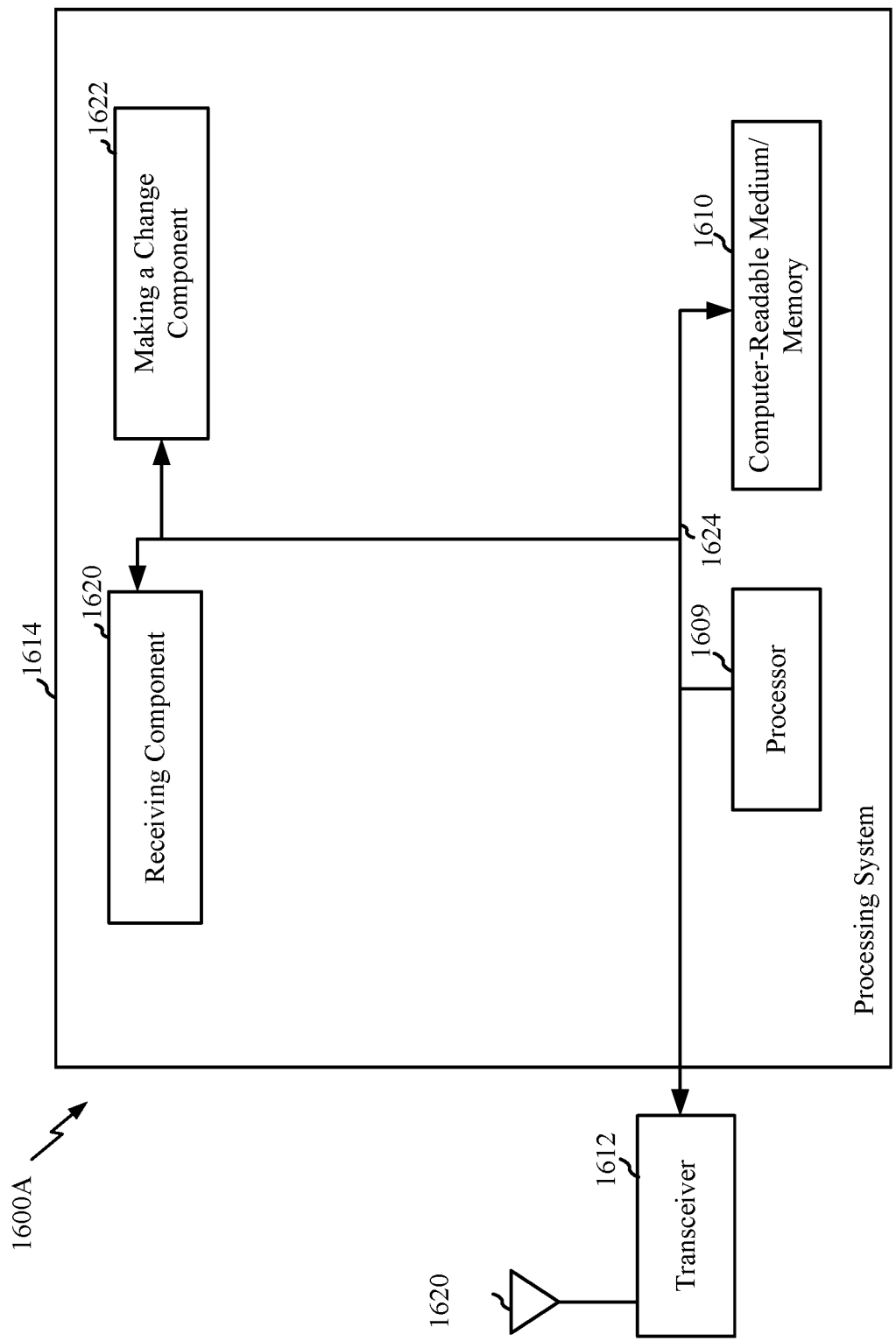
FIG. 16A illustrates a communications device that may include various components configured to perform the operations of FIG. 16, in accordance with aspects of the present disclosure.

FIG. 16A illustrates a communications device 1600A (i.e., SMF) that may include various components (e.g., corresponding to means-plus-function components) configured to perform operations for the techniques disclosed herein, such as one or more of the operations illustrated in FIG. 16. The communications device 1600A includes a processing system 1614 coupled to a transceiver 1612. The transceiver 1612 is configured to transmit and receive signals for the communications device 1600A via an antenna 1620. The processing system 1614 may be configured to perform processing functions for the communications device 1600A, such as processing signals, etc.

The processing system 1614 includes a processor 1609 coupled to a computer-readable medium/memory 1610 via a bus 1624. In certain aspects, the computer-readable medium/memory 1610 is configured to store instructions that when executed by processor 1609, cause the processor 1609 to perform one or more of the operations illustrated in FIG. 16, or other operations for performing the various techniques discussed herein.

In certain aspects, the processing system 1614 further includes a receiving component 1620 for performing one or more of the operations illustrated at 1602 in FIG. 16. Additionally, the processing system 1614 includes a making a change component 1622 for performing one or more of the operations illustrated at 1604 in FIG. 16.

The receiving component 1620 and the making a change component 1622 may be coupled to the processor 1609 via bus 1624. In certain aspects, the receiving component 1620 and the making a change component 1622 may be hardware circuits. In certain aspects, the receiving component 1620 and the making a change component 1622 may be software components that are executed and run on processor 1609.

Figure 17:
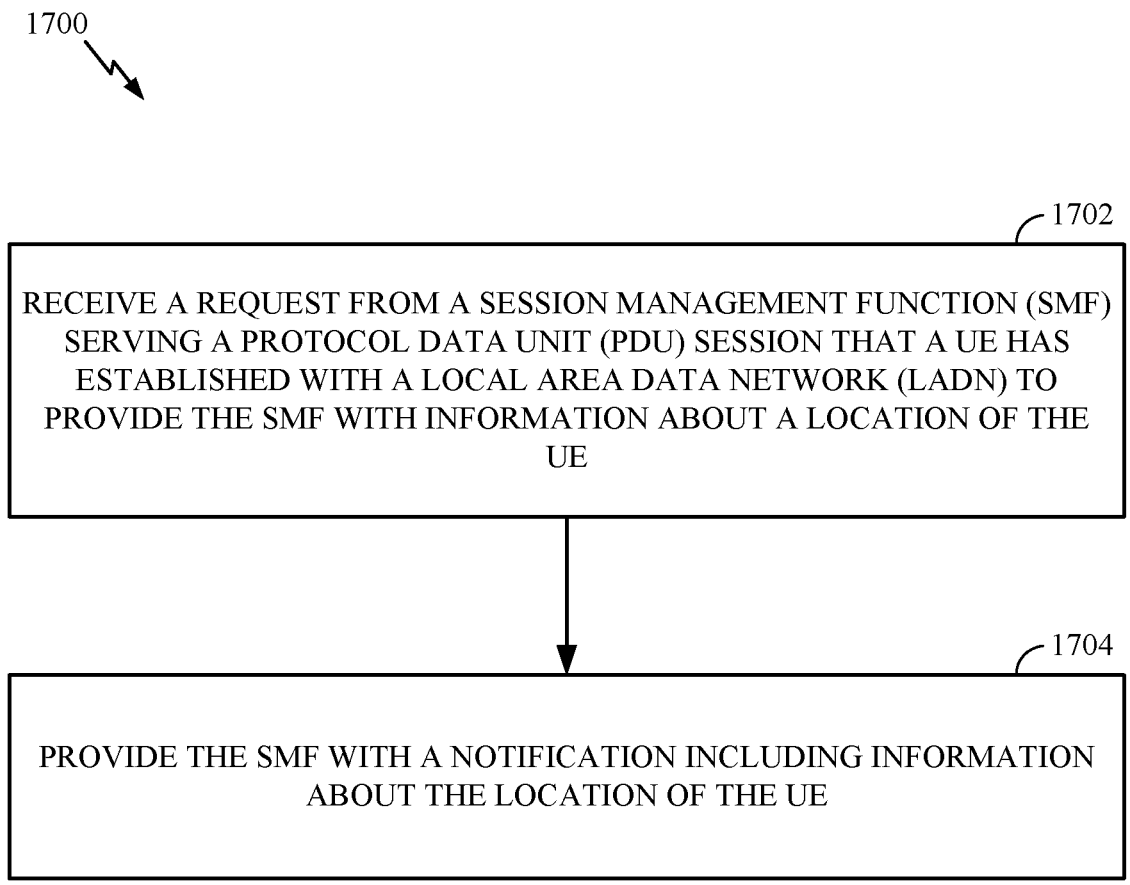
FIG. 17 illustrates example operations for use by an AMF, in accordance with aspects of the present disclosure.

FIG. 17 illustrates example operations 1700 for wireless communications by a network device, according to aspects of the present disclosure. The network device performing operations 1700 may be, for example, an AMF. Operations 1700 begin, at 1702, by receiving a request from a session management function (SMF) serving a protocol data unit (PDU) session that a UE has established with a local area data network (LADN) to provide the SMF with information about a location of the UE. At 1704, operations 1700 continue by providing the SMF with a notification including information about the location of the UE.

Figure 17A:
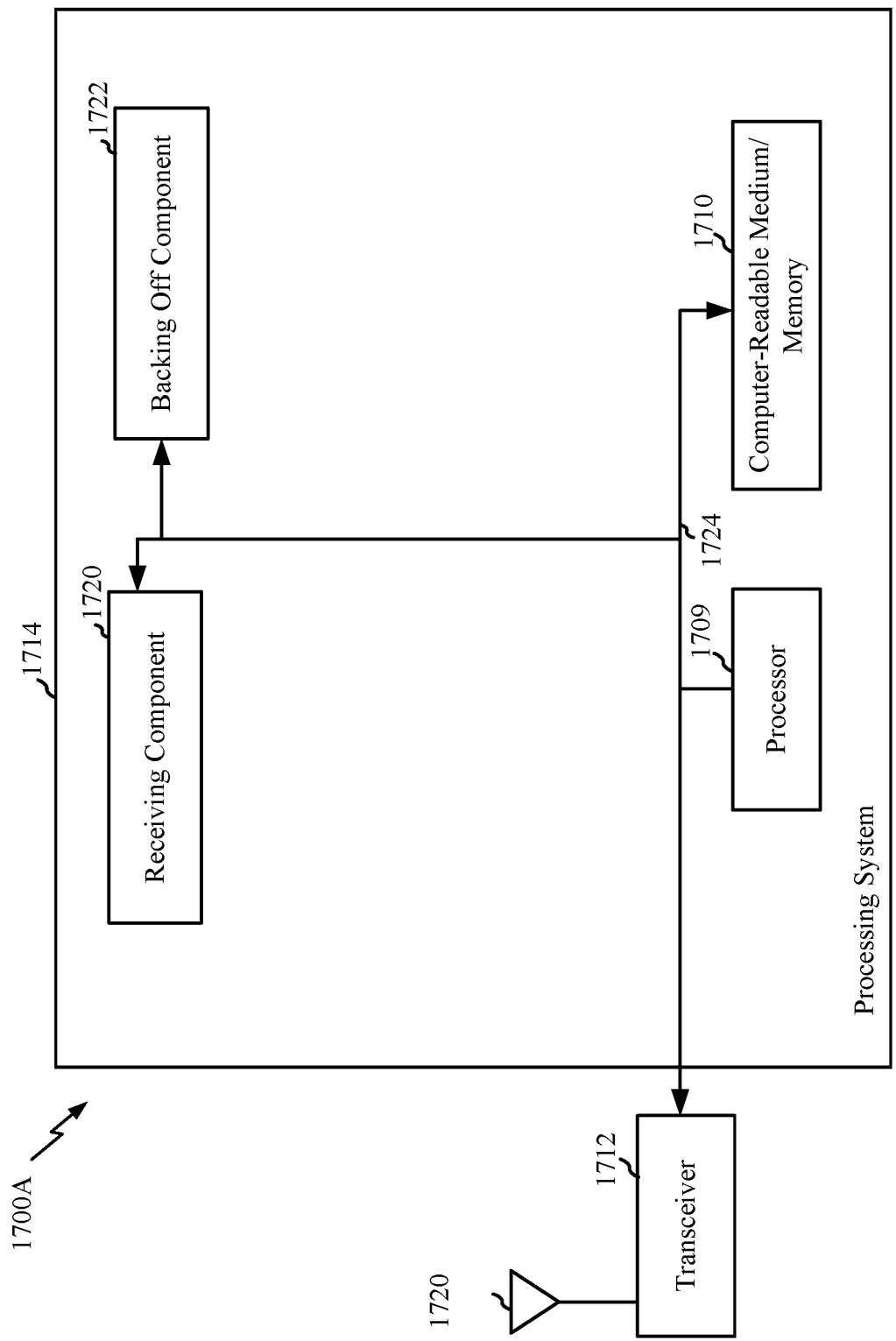
FIG. 17A illustrates a communications device that may include various components configured to perform the operations of FIG. 17, in accordance with aspects of the present disclosure.

FIG. 17A illustrates a communications device 1700A (i.e., AMF) that may include various components (e.g., corresponding to means-plus-function components) configured to perform operations for the techniques disclosed herein, such as one or more of the operations illustrated in FIG. 17. The communications device 1700A includes a processing system 1714 coupled to a transceiver 1712. The transceiver 1712 is configured to transmit and receive signals for the communications device 1700A via an antenna 1720. The processing system 1714 may be configured to perform processing functions for the communications device 1700A, such as processing signals, etc.

The processing system 1714 includes a processor 1709 coupled to a computer-readable medium/memory 1710 via a bus 1724. In certain aspects, the computer-readable medium/memory 1710 is configured to store instructions that when executed by processor 1709, cause the processor 1709 to perform one or more of the operations illustrated in FIG. 17, or other operations for performing the various techniques discussed herein.

In certain aspects, the processing system 1714 further includes a receiving component 1720 for performing one or more of the operations illustrated at 1702 in FIG. 17. Additionally, the processing system 1714 includes a providing component 1722 for performing one or more of the operations illustrated at 1704 in FIG. 17.

The receiving component 1720 and the providing component 1722 may be coupled to the processor 1709 via bus 1724. In certain aspects, the receiving component 1720 and the providing component 1722 may be hardware circuits. In certain aspects, the receiving component 1720 and the providing component 1722 may be software components that are executed and run on processor 1709.

For LADN PDU Session Release, in some embodiments, the 5G core network may explicitly release the PDU session to inform the UE that the connectivity to the LADN is no longer available. In such embodiments, the AMF may need to know the exact UE location when the UE is in the CM-CONNECTED mode and report to the SMF the location of the UE or that that UE had left the LADN area (i.e. "leave LADN area" event). In addition to LADN PDU Session Release, certain embodiments described herein relate to (2) Indefinite LADN PDU Session Suspension, or (3) LADN PDU Session Suspension.

For Indefinite LADN PDU Session Suspension, the 5G core network may suspend the user plane resources for the PDU session to the LADN (i.e. N3 is released), in order to allow the PDU session to remain inactive until the UE re-enters the area of availability. Suspending the PDU session may help avoid a PDU session release procedure as well as a subsequent PDU session establishment procedure as the UE leaves and enters the area of availability. In some embodiments, a suspended PDU session may be a PDU session for which no user plane is established between the UE and the CN (i.e. no data radio bearer or connection over the access, and no N3 connection). As discussed above, for Indefinite LADN PDU Session Suspension, the UE may not need to re-establish the PDU session when moving back to the LADN availability area.

For LADN PDU Session Suspension, in some embodiments, as soon as the network has detected that the UE has left the area of LADN availability, the 5G core network may release the UP for the PDU session. In such embodiments, the 5G core network may also start a UE PDU Session Suspension Timer as well as a network (NW) PDU Session Suspension Timer at the network (e.g. the SMF) and the UE, respectively. In such embodiments, the NW PDU Session Suspension Timer may be set for a slightly longer time period than the UE PDU Session Suspension Timer. In such embodiments, when the NW PDU Session Suspension Timer expires at the network side, the network may disconnect the PDU session and, therefore, the UE may stop the UE PDU Session Suspension Timer. Also, in such embodiments, if the UE PDU Session Suspension Timer expires at the UE side (e.g. if the UE has for some reason not received the disconnect notification from the network), the UE may locally disconnect the PDU session. Accordingly, for LADN PDU Session Suspension, the PDU session may be maintained only for a reasonable amount of time, to address the UE's ping-pong mobility between locations while allowing the PDU disconnection if the UE does not return to the area of availability of the LADN.

In some embodiments, the three PDU session treatment actions ((1) LADN PDU Session Release, (2) Indefinite LADN PDU Session Suspension, or (3) LADN PDU Session Suspension) described above may be triggered in three ways including (1) AMF-triggered PDU Treatment, (2) SMF-triggered PDU Treatment, or (3) (R)AN-triggered PDU suspension. For AMF-triggered PDU Treatment, either a LADN PDU Session Release or LADN PDU Session Suspension may be triggered by the AMF, in some embodiments. This AMF triggering may, in some embodiments, be based on subscription information and local policies and based on either detecting that the UE has moved outside the service area of the LADN or receiving an indication from the (R)AN that the user plane resources for the PDU session have been released in the AN). In such embodiments, the AMF may trigger the SMF to drop or suspend the PDU session. Also, in such embodiments, the AMF may send a notification request over N11 to the serving SMF to trigger the SMF to drop or suspend the PDU session. In such embodiments, the SW may then proceed with the indicated treatment (i.e. either drop or suspend the PDU session).

For SW-triggered PDU Treatment, either a LADN PDU Session Release or a LADN PDU Session Suspension may be triggered by the SW upon being notified that the UE has moved outside the area of coverage of the LADN or upon receiving an indication from the AMF, in some embodiments. In such embodiments, the AMF may determine that the UE has moved outside the service area of the LADN or receive an indication from the (R)AN that the user plane resources for the PDU session have been released in the AN and subsequently indicate to the SMF, serving the PDU session corresponding to the LADN, that the UE is outside the area of availability. Accordingly, the SW may then decide whether to drop or suspend the PDU session based on policies.

For (R)AN-triggered PDU suspension, the AN may send a trigger to the AMF that the PDU session should be suspended. In such embodiments, either the AMF-triggered or SW-triggered PDU treatments may then take place.

Example LADN Availability Awareness in the Network

In all of the three ways discussed above ((1) AMF-triggered PDU Treatment, (2) SW-triggered PDU Treatment, or (3) (R)AN-triggered PDU suspension), the RAN may know the exact location of the UE in CM-CONNECTED (either current cell or tracking area) and may also know the UE location when the UE transitions from CN-IDLE to CM-CONNECTED.

For AMF-triggered PDU Treatment or SMF-triggered PDU Treatment as described above, where the AN continuously reports the location to the UE to the AMF, in some embodiments, the SMF may send a PDU session establishment accept message to the AMF (e.g. session management (SM) Request Acknowledgement (N2 SM information (PDU Session ID, QoS Profile, CN Tunnel Info), N1 SM Container (PDU Session Establishment Accept (Authorized QoS Rule, SSC mode)))) after a PDU session is established for an LADN. In such embodiments, the SMF may include in the SM request acknowledgement an indication for the AMF to inform the AMF that the PDU session is for an LADN.

Upon receiving the indication from the SW that the PDU session is for a LADN, in some embodiments, the AMF may store such information and the LADN availability area together with the mapping of the PDU Session ID and the SMF ID. In some embodiments, when providing the N2 SM Information to the AN in the N2 PDU Session Request (N2 information received from SW in DL N2 Transfer Information Request, NAS message), the AMF may further include a request to the AN to report the current serving cell of the UE.

For AMF-triggered PDU Treatment or SW-triggered PDU Treatment as described above, where the AN only reports when the UE enters or exits the LADN availability area, in some embodiments, the SW may send a PDU session establishment accept message to the AMF (e.g. SM Request Acknowledgement (N2 SM information (PDU Session ID, QoS Profile, CN Tunnel Info), N1 SM Container (PDU Session Establishment Accept (Authorized QoS Rule, SSC mode)))) after a PDU session is established for an LADN. In such embodiments, the SW may include in the SM request acknowledgement an indication for the AMF to inform the AMF that the PDU session is for an LADN.

Upon receiving the indication from the SW that the PDU session is for a LADN in the SM Request Acknowledgement, in some embodiments, the AMF may include in the N2 PDU Session Request (N2 information received from SW in DL N2 Transfer Information Request, NAS message) the LADN Availability Area containing the set of cells in which the LADN is available and the PDU Session ID.

In addition, after receiving the N2 PDU Session Request, the LADN Availability Area, and the PDU Session ID from the AMF, in some embodiments, the AN may send an indication LADN UE Location Change to the AMF when the UE changes its location with respect to the LADN Availability Area (i.e. entering or exiting). In such embodiments, the indication may contain the PDU Session ID, to inform the AMF that the UE has entered or exited the LADN availability area.

For (R)AN-triggered PDU Suspension, in some embodiments, the SMF may send a PDU session establishment accept message to the AMF (e.g. SM Request Acknowledgement (N2 SM information (PDU Session ID, QoS Profile, CN Tunnel Info), N1 SM Container (PDU Session Establishment Accept (Authorized QoS Rule, session and service continuity (SSC) mode)))) after a PDU session is established for an LADN. In such embodiments, the SMF may include in the SM request acknowledgement an indication for the AMF to inform the AMF that the PDU session is for an LADN. In such embodiments, the SMF may also include in the N2SM Information a LADN AN information.

In such embodiments, upon receiving the indication from the SMF that the PDU session is for a LADN, the AMF may include in the N2 PDU Session Request (N2 information received from SMF in DL N2 Transfer Information Request, NAS message) the LADN Availability Area containing the set of cells in which the LADN is available as well as the PDU Session ID.

In addition, upon receiving from the AMF the N2 PDU Session Request containing the LADN Availability Area, the PDU Session ID, and the N2 SM information containing the LADN AN Information, in some embodiments, the AN may perform the actions described in the LADN AN information upon the UE exiting the LADN Availability Area. In some embodiments, for example, one of such actions may be to trigger a PDU Session Suspension Request or a User Plane Suspension request message to the AMF including the PDU Session ID. In some embodiments, one of such actions may be to release the UE user plane resources for the PDU session (specific access resources, e.g. radio bearers, and optionally the UL tunnel information for the N3 tunnel), and to trigger a PDU Session Suspension Notification or a User Plane Suspension Notification message to the AMF including the PDU Session ID.

In some embodiments, the access network may report to the AMF the UE location with respect to the current serving cell or tracking area when the UE is CM-CONNECTED or when the UE transitions from CM-IDLE to CM-CONNECTED. In some embodiments, if LADN is available only in specific cells/tracking areas of the current registration area, the AMF may need to know where exactly the UE is to take an action on the PDU session. Accordingly, the AMF may request the AN to report such information on a per-UE basis in various embodiments. In some situations, the AMF may make such a request when the UE is subscribed to any LADN (independently of whether the LADN is available in a registration area that can be served by the AMF). In some embodiments, the AMF may make such request only when one or more of the LADNs that the UE is subscribed to are available in a set of cells and/or tracking areas that can be served by the AMF. In some embodiments, the AMF may make such request only when one or more of the LADNs that the UE is subscribed to are available in set of cells and/or tracking areas belonging to the Registration Area that the AMF provides to the UE upon registration management procedures.

Subsequently, the AMF may provide to the SMF information about the availability of the LADN corresponding to a PDU session service by the SMF. After session establishment and upon determining that the PDU session corresponds to a LADN, in some embodiments, the SMF may request the AMF to provide information about the availability of the LADN and provide the DNN corresponding to the PDU session for the LADN.

In some embodiments, the SMF may request the AMF to provide the specific UE location (e.g. cell ID, tracking area, etc.). In some other embodiments, the SMF may not be aware of the area of availability of the LADN and request the AMF to provide an indication of when the UE exits the area of availability of a LADN and when the UE re-enters the area of availability of the LADN. In some embodiments, after the PDU session establishment, the AMF may store the DNN of the PDU session, as well as the PDU Session ID and the identity of the serving SMF, in order to provide the subscribed LADN information to the SMF.

Example Core Network Behavior Upon Suspending a PDU Session for a LADN

For LADN PDU Session Suspension as described above, whether the decision to suspend is made by the AMF or the SMF, the SMF may notify the serving UPF(s) that the PDU session is suspended, release the N3 connectivity by instructing the serving UPF using the N4 interface, and instruct the AN (via the AMF) to release the access network resources for the PDU session. In case of a non-roaming UE, in some embodiments, the serving UPF that the SMF interacts with may be the home UPF (H-UPF). In contrast, in case of a roaming UE, the serving UPF may be the visitor UPF (V-UPF).

In some embodiments, the notification from the SMF to the UPF(s) may include an indication to the UPF to not buffer any downlink data when the PDU session is suspended and also not to provide a DL Data Notification to the SMF. In some embodiments, upon suspending a PDU session, the SMF may start the NW PDU Session Suspension Timer. In addition, in some embodiments, upon suspending a PDU session, the SMF may notify the UE that the PDU session is suspended using two different techniques. Under a first technique, the SMF may send an explicit NAS PDU Suspension Notification message to the UE containing the PDU Session ID. In such embodiments, the UE may respond to the NAS PDU Suspension Notification message with a NAS PDU Suspension Accept.

Under a second technique, the SMF may indicate in its request to the AMF, for triggering the access network resource release, that the release is related to a PDU session suspension. In some embodiments, the AMF may provide the information obtained from the SMF to the access network, and the access network (e.g. the RAN) may send to the UE an access network resources release request (e.g. an RRC reconfiguration message that releases the bearers of the PDU session) containing an indication that the request relates to a PDU session suspension.

In some embodiments, the UE may start the UE PDU Session Suspension Timer for a PDU session when (1) the UE leaves the area of availability of the LADN corresponding to the PDU session, (2) the UE receives a NAS PDU Suspension Notification message, or (3) the UE receives from the network (e.g. the RAN) an access network resources release request (e.g. an RRC reconfiguration message that releases the bearers of the PDU session) containing an indication that the request relates to a PDU session suspension. Where the UE receives from the network an access network resources release request containing an indication that the request relates to a PDU session suspension, in some embodiments, the UE may identify the PDU session being suspended based on the mapping between the access network resources being suspended and the PDU session.

Example Treatment of DL Data for a Suspended PDU Session for a LADN

In some embodiments, if the network "suspends" a PDU session to a LADN because the UE is outside the area of availability for the LADN, or the UE is CM-IDLE, the network behavior for DL data for a PDU session corresponding to a LADN may differ from the network behavior in the general case of DL data for a "suspended" PDU session.

In some embodiments, under the AMF-controlled PDU Treatment, when the UE is outside the area of availability of a LADN and the serving AMF receives a request via N11 to establish connectivity with the UE (e.g. send a Paging Request to a CM-IDLE UE, or send a Network Triggered Service request to a CM-CONNECTED UE) from an SMF serving a suspended PDU session corresponding to a LADN (i.e. a PDU session for which no user plane connectivity exists between the UE and the CN, i.e. no data radio bearers and no N3 connectivity), the AMF may reject the request from the SMF if the UE is outside the area of availability of the LADN. In some embodiments, the AMF may not send a Paging Request to a CM-IDLE UE, or send a Network Triggered Service request to a CM-CONNECTED UE, upon receiving a request corresponding to a PDU session for a LADN if the UE is outside the area of coverage of the LADN. In some embodiments, the AMF may additionally inform the SMF that no further requests to establish connectivity with the UE may be sent by the SMF via N11.

In some embodiments, for the SMF-controlled PDU Treatment, if a PDU session is suspended, upon receiving a DL Data notification from a serving UPF, the SMF may discard the notification and also may not trigger a request towards the AMF to establish connectivity with the UE. In some embodiments, the SMF may also indicate to the UPF(s) to stop buffering data and also may not provide further DL Data Notification messages.

In some embodiments, for AMF-controlled PDU Treatment, the AMF may inform the SMF that the LADN is available, when the UE enters the area of availability of a LADN, if the UE has a suspended PDU session corresponding to the LADN.

In some embodiments, when the SMF receives a notification from the AMF that the UE is in the area of availability of a LADN for which the UE has a suspended PDU session, the SMF may send a request to the serving UPF(s) to resume buffering data and send DL data notifications to the UE.

In some embodiments, when a suspended PDU session is resumed by the UE, the SMF may set up (i.e., activate) the user plane connection over the access and over N3 and also instruct the serving UPF(s) to resume buffering data and send DL data notifications to the UE.

Example UE Explicitly Resuming a Suspended PDU Session for a LADN

In some embodiments, when outside the area of availability of a LADN, the UE may not attempt to establish a PDU session to the LADN. In some embodiments, if the PDU session is already established but no user plane resources are active for the PDU session, the UE may not send a Service Request to establish resources for the PDU session for the LADN.

Accordingly, in some embodiments, in order to support LADNs, a UE in CM-IDLE state may perform a service request procedure when the UE has uplink user data to be sent corresponding to a PDU session for a LADN and the UE is in the area of availability of the LADN. As a result, when the UE is CM-IDLE, upon determining that the UE has uplink data for a PDU session that corresponds to a LADN, in some embodiments, the UE may verify whether the UE is in the area of availability of the LADN. In some embodiments, a UE in CM-IDLE state may not perform a service request procedure when the UE has uplink user data to be sent corresponding to a PDU session for a LADN and the UE is outside the area of availability of the LADN.

Example UE Implicitly Resuming a Suspended PDU Session for a LADN

In some embodiments, for a PDU session corresponding to a LADN, the UE may provide an indication to the network of whether a suspended PDU session corresponding to the LADN may automatically be re-established upon the UE entering the area of availability of the LADN. In some embodiments, under an AMF-controlled PDU Treatment, the UE may provide the indication to the AMF either at PDU session establishment, or in an RM procedure by providing the DNN corresponding to the LADN and the indication of implicit resuming. When the PDU session is suspended, upon the UE entering the area of availability of the LADN, the AMF triggers a notification over N11 to re-establish the user plane resources for the PDU session by triggering a NW triggered Service Request. In some embodiments, under an SMF-controlled PDU Treatment, the UE may provide the indication to the SMF at PDU session establishment. Upon receiving an indication from the AMF that the UE has entered the area of availability of the LADN, in some embodiments, the SMF may trigger a network triggered service request for the PDU session.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications for an access and mobility management function (AMF), comprising:
    determining that a user equipment (UE) has moved outside of an area of availability corresponding to a local area data network (LADN) to which the UE has an established protocol data unit (PDU) session, based on receiving an indication, from an access network (AN), that user plane resources for the PDU session have been released in the AN;
    determining to suspend or release the PDU session when it is determined that the UE has moved outside of the area of availability; and
    sending a notification request to a session management function (SMF) serving the PDU session in response to determining to suspend or release the PDU session, wherein the notification request comprises a request for the SMF to suspend or release the PDU session.

2. The method of claim 1, further comprising:
    receiving a request from the SMF to provide the SMF with an indication of when the UE moves outside the area of availability.

3. The method of claim 2, wherein the request from the SMF further comprises a request from the SMF to provide the SMF an indication of when the UE re-enters the area of availability.

4. The method of claim 1, further comprising:
    receiving a request from the SMF to provide the SMF with information about a location of the UE.

5. The method of claim 4, wherein the information about the location of the UE comprises at least one of a cell ID associated with a cell in which the UE operates or a tracking area.

6. The method of claim 1, further comprising:
    requesting the AN to report information about a location of the UE.

7. The method of claim 6, further comprising:
    receiving a notification from the access network about the location of the UE.

8. The method of claim 1, wherein the PDU session is disconnected once a timer expires.

9. The method of claim 1, wherein the PDU session is suspended by the SMF indefinitely in response to the SMF receiving the notification request.

10. The method of claim 1, wherein the PDU session is released by the SMF in response to the SMF receiving the notification request.

11. The method of claim 1, further comprising:
    receiving, in response to the UE establishing the PDU session to the LADN, information included in a session management (SM) Request Acknowledgement from the SMF, wherein the information informs the AMF that the PDU session corresponds to the LADN.

12. The method of claim 11, further comprising:
    storing the information, an area of availability corresponding to the LADN, and a mapping of a PDU session ID of the PDU session to a SMF ID of the SMF.

13. The method of claim 11, further comprising:
    sending, to the AN, a PDU session request including an availability area corresponding to the LADN in response to receiving the information from the SMF.

14. The method of claim 13, further comprising:
    receiving additional information relating to a movement of the UE with respect to the area of availability of the LADN.

15. A method of wireless communications for a session management function (SMF), comprising:
    receiving a notification, from an access and mobility management function (AMF), that a user equipment (UE) has moved outside of an area of availability corresponding to a local area data network (LADN) to which the UE has an established protocol data unit (PDU) session, in response to user plane resources for the PDU session having been released in an access network (AN), wherein the notification comprises a request to suspend or release the PDU session;
    wherein the AMF determines to suspend or release the PDU session when it is determined that the UE has moved outside the area of availability,
    wherein the notification is received in response to the AMF determining to suspend of release the PDU session and
    making a change to the PDU session being served by the SMF in response to the notification.

16. The method of claim 15, wherein making the change to the PDU session comprises releasing the PDU session.

17. The method of claim 15, wherein making the change to the PDU session comprises suspending the PDU session.

18. The method of claim 17, wherein the PDU session is disconnected once a timer expires.

19. The method of claim 17, wherein the PDU session is suspended by the SMF indefinitely.

20. The method of claim 15, further comprising:
sending, in response to the UE establishing the PDU session to the LADN, information included in a session management (SM) Request Acknowledgement to the AMF, wherein the information informs the AMF that the PDU session corresponds to the LADN.

21. The method of claim 15, further comprising:
requesting, from the AMF, information relating to an availability of the LADN.

22. The method of claim 15, further comprising:
starting a timer for disconnecting the PDU session when the UE moves outside the area of availability corresponding to the LADN.

23. The method of claim 15, further comprising:
receiving another notification from the AMF that the UE has re-entered the area of availability corresponding to the LADN;
triggering a network triggered service request for the PDU session; and
activating a user plane connection with a core network.

* * * * *